United States Patent
Kunieda

(10) Patent No.: US 9,298,972 B2
(45) Date of Patent: Mar. 29, 2016

(54) IMAGE PROCESSING APPARATUS AND IMAGE PROCESSING METHOD

(75) Inventor: Hiroyasu Kunieda, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 153 days.

(21) Appl. No.: 13/146,189

(22) PCT Filed: Dec. 13, 2010

(86) PCT No.: PCT/JP2010/072821
§ 371 (c)(1),
(2), (4) Date: Jul. 25, 2011

(87) PCT Pub. No.: WO2012/035672
PCT Pub. Date: Mar. 22, 2012

(65) Prior Publication Data
US 2012/0099762 A1   Apr. 26, 2012

(30) Foreign Application Priority Data
Sep. 15, 2010   (JP) .................................. 2010-207155

(51) Int. Cl.
*G06K 9/46*   (2006.01)
*G06K 9/00*   (2006.01)
*G06K 9/62*   (2006.01)

(52) U.S. Cl.
CPC .......... *G06K 9/00248* (2013.01); *G06K 9/6257* (2013.01)

(58) Field of Classification Search
None
See application file for complete search history.

(56) References Cited

U.S. PATENT DOCUMENTS

| 5,818,443 | A  | * | 10/1998 | Schott ..................... G06T 7/001 382/141 |
| 6,055,334 | A  | * | 4/2000  | Kato ..................... G06K 9/6203 382/103 |
| 6,185,343 | B1 | * | 2/2001  | Ikeda ..................... G06K 9/6203 382/216 |
| 7,502,493 | B2 | * | 3/2009  | Ishida ........................... 382/118 |
| 2003/0231243 | A1 | * | 12/2003 | Shibutani ............... G03B 17/02 348/207.99 |
| 2004/0022435 | A1 | * | 2/2004  | Ishida ................ G06K 9/00228 382/190 |
| 2005/0013479 | A1 | * | 1/2005  | Xiao ..................... G06K 9/4614 382/159 |
| 2006/0098844 | A1 |   | 5/2006  | Luo |
| 2007/0189584 | A1 | * | 8/2007  | Li ....................... G06K 9/00295 382/118 |
| 2009/0297038 | A1 | * | 12/2009 | Ishikawa ............... G06K 9/3275 382/209 |
| 2009/0324079 | A1 | * | 12/2009 | Yuan ....................... G06T 3/403 382/176 |
| 2010/0149365 | A1 | * | 6/2010  | Ishihara ............. G06K 9/00221 348/222.1 |

(Continued)

FOREIGN PATENT DOCUMENTS

| JP | 2007-226424 A | 9/2007 |
| JP | 2007-233517 A | 9/2007 |

(Continued)

OTHER PUBLICATIONS

Wu et al "Fast Rotation Invariant Multi-View face detection base on Real Adaboost", Sixth IEEE 2004.*

*Primary Examiner* — Tsung-Yin Tsai
(74) *Attorney, Agent, or Firm* — Fitzpatrick, Cella, Harper & Scinto

(57) ABSTRACT

In a case where detecting a face contained in an image, the face is detected in all directions of the image by combining the rotation of a detector in the face detecting direction, and the rotation of the image itself. If the angle made by the image direction and the detecting direction of the detector is an angle at which image deterioration readily occurs, the detection range of the detector is made narrower than that for an angle at which image deterioration hardly occurs.

7 Claims, 22 Drawing Sheets

(56) References Cited

U.S. PATENT DOCUMENTS

| | | | | |
|---|---|---|---|---|
| 2010/0202693 A1* | 8/2010 | Song | | G06K 9/00375 382/190 |
| 2011/0183711 A1* | 7/2011 | Melzer | | H04N 5/23219 455/556.1 |
| 2011/0274315 A1* | 11/2011 | Fan | | G06K 9/00771 382/103 |
| 2013/0011080 A1* | 1/2013 | Shinoda | | G06T 7/001 382/296 |

FOREIGN PATENT DOCUMENTS

| | | | |
|---|---|---|---|
| JP | 2008-519336 A | 6/2008 | |
| JP | 2009-026299 A | 2/2009 | |
| WO | WO 2012035672 A1 * | 3/2012 | ......... G06K 9/00248 |

* cited by examiner

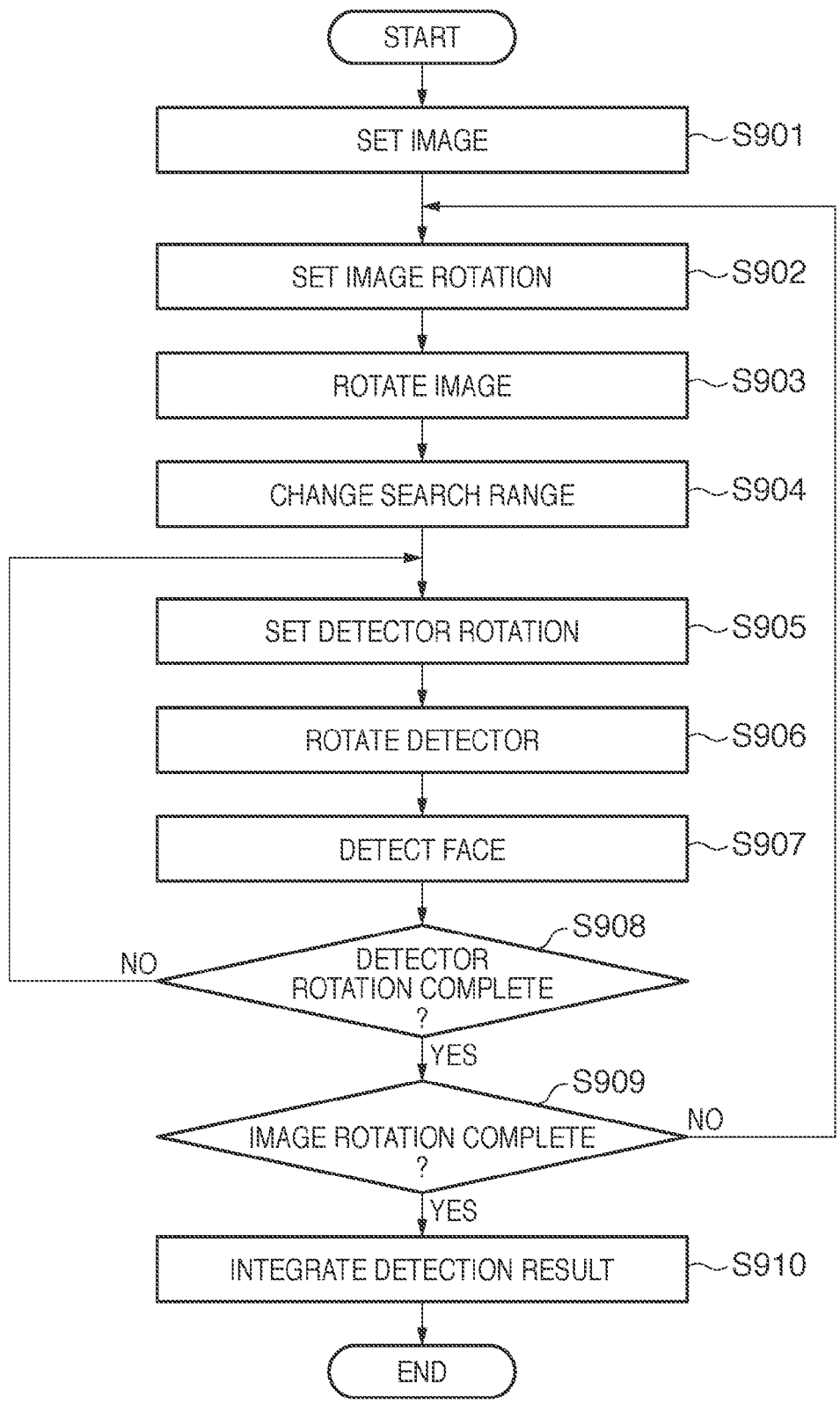

FIG. 19A

| WEAK CLASSIFIER No | 1 | 2 | 3 | 4 | 5 | 6 | 7 | ... | N-1 | N |
|---|---|---|---|---|---|---|---|---|---|---|
| ANGLE CHARACTERISTIC | RANGE 3 | RANGE 1 | RANGE 2 | RANGE 4 | RANGE 4 | RANGE 3 | RANGE 1 | ... | RANGE 3 | RANGE 2 |

FIG. 19B

| WEAK CLASSIFIER No | 1 | 2 | 3 | 4 | 5 | 6 | 7 | ... | N-1 | N |
|---|---|---|---|---|---|---|---|---|---|---|
| SWITCH | 1 | 1 | 1 | 1 | 1 | 1 | 1 | ... | 1 | 1 |

FIG. 19C

| WEAK CLASSIFIER No | 1 | 2 | 3 | 4 | 5 | 6 | 7 | ... | N-1 | N |
|---|---|---|---|---|---|---|---|---|---|---|
| SWITCH | 1 | 0 | 1 | 0 | 0 | 1 | 0 | ... | 1 | 1 |

FIG. 25

|  | Step 1 | Step 2 | Step 3 |
|---|---|---|---|
| IMAGE ROTATION UNIT ANGLE OF 90° | ONE SPLIT *D101 | TWO SPLITS *D201 *D301 | FOUR SPLITS *D401 *D501 *D601 *D701 |
| IMAGE ROTATION OTHER THAN UNIT ANGLE OF 90° | ONE SPLIT *D101 | TWO SPLITS *D201 *D301 | TWO SPLITS *D501 *D601 |

IMAGE PROCESSING APPARATUS AND IMAGE PROCESSING METHOD

TECHNICAL FIELD

The present invention relates to an image processing apparatus and image processing method to detect an image region such as a face having a specific feature.

BACKGROUND ART

An image detection method to automatically detect a specific object pattern from an image is very useful, and usable in determining, for example, a human face. A method like this can be used in many fields including communication conferences, man-machine interfaces, security, monitoring systems for tracking human faces, and image compression.

Known examples of the technique of detecting a face from an image as described above are: a method of using several significant features and unique geometric positional relationships between the features; and a method of detecting human faces by using symmetrical features of human faces, features of human face colors, template matching, or a neural network.

When detecting a face from an image, a person is not always standing upright and facing front, and a camera may capture an image in an arbitrary direction at an arbitrary magnification. This makes it necessary to cope with various angles and sizes that faces can take. Accordingly, a detection process must be repeated while slightly changing the angle, size, and detection position of a detector.

This detection process requires a long time, however, if the process is performed for all combinations of enormous numbers of angles and sizes. Therefore, methods of reducing the detection process by restricting a search area have been proposed. Examples are a method of restricting a search area by limiting the angle and size of a face based on the initial detection result (Japanese Patent Laid-Open No. 2007-233517), and a method of restricting a search area by predicting the angle and size of a face from the detection result of the first one of successively captured images (Japanese Patent Laid-Open No. 2009-026299).

Unfortunately, the method described in Japanese Patent Laid-Open No. 2007-233517) cannot detect a correct face region if the initial detection result is a detection error. Also, the method described in Japanese Patent Laid-Open No. 2009-026299 cannot restrict the search range for an image that is not successively captured, and hence cannot shorten the processing time. Thus, the conventional methods of reducing the face detection process have various problems. Therefore, demands have arisen for a face detection process performed by an appropriate method that shortens the time of the detection process.

To detect faces in all directions, a method of widening the detection angle of a detector is possible. If the detection angle is widened, however, the robustness decreases, and this may worsen the detection performance. Especially when the detection algorithm requires learning, the widened detection angle complicates the learning. This not only prolongs the learning time, but also increases the possibility that the learning does not converge. Accordingly, the method of widening the detection angle is unadvisable, and it is necessary to use a detector having a proper detection angle.

Since the detection angle is restricted, a method of rotating only a detector a number of times is possible in order to detect faces in all directions. However, when analyzing a filter output value during detection, a filter is rotated. Consequently, the rotation changes the characteristics of the filter output, so no designed features can be captured, and the detection performance significantly deteriorates. Also, when rapidly analyzing a rectangular region by using Integral Image, no rapid analysis can be performed for rotation except for integral multiples of 90°. This significantly decreases the processing speed. Note that Integral Image is a method of obtaining the total sum of pixels in a specific rectangular region of an image.

On the other hand, a method of separately preparing an oblique detection parameter is possible, because the detection angle is restricted. When a detector requires learning, however, it is difficult to perform learning that equalizes the detection performances of two kinds of parameters for 90° rotation and oblique detection, and a detection performance difference is produced between the two kinds of parameters. As a consequence, when integrating the detection results of the two kinds of parameters, the overall detection performance degrades under the influence of a detection error. Furthermore, the use of the parameter for oblique detection requires not only an enormous learning time, but also a memory area for the parameter.

To detect faces in all directions that can appear in an image, therefore, the image must be rotated at angles other than the integral multiples of 90° of a detector, in addition to the rotations at the integral multiples of 90°. If the image is rotated, however, the image quality deteriorates because interpolation is necessary at angles other than the integral multiples of 90°. If the detection process is performed on the deteriorated image, analytical results different from prelearned analytical contents may be obtained, and the detection performance may deteriorate.

In the conventional techniques as described above, when detecting a region (for example, a face region) having a specific feature from an image regardless of the direction of the region, the processing time prolongs, or the detection performance degrades.

SUMMARY OF INVENTION

The present invention has been made in consideration of the above situation, and provides an image processing method and image processing apparatus capable of detecting a region (for example, a face region) having a specific feature that can appear in an image, within a short time regardless of the direction of the image region, while suppressing the deterioration of the detection performance.

The present invention includes the following arrangement. That is, according to one aspect of the present invention, there is provided an image processing apparatus for detecting an object contained in an image, characterized by comprising: image rotating means for rotating the image through a predetermined rotational angle; detector rotating means for rotating a detector which detects the object, through a predetermined rotational angle; setting means for, if the image rotating means rotates the image through a rotational angle at which image degradation occurs in the image, setting a detection range of the detector narrower than that in a case where the image is rotated through a rotational angle at which no image degradation occurs in the image; and detecting means for detecting an object contained in the image by searching the detection range set by the setting means, for a plurality of target images obtained by rotating the image through different rotational angles by the image rotating means, by using a detector rotated through a plurality of different rotational angles by the detector rotating means.

When detecting an image region having a specific feature, the present invention can suppress the deterioration of the detection performance by narrowing the detection range if the image deteriorates. The present invention can also shorten the detection time by narrowing the detection range.

Further features of the present invention will become apparent from the following description of exemplary embodiments with reference to the attached drawings.

BRIEF DESCRIPTION OF DRAWINGS

FIG. 9 is a flowchart for explaining the example of the arrangement of the image processing apparatus according to the first embodiment;

FIGS. 19A, 19B, and 19C are views showing an example of a correspondence table of the angle characteristics of weak classifiers, and examples of a use setting table corresponding to image rotation;

FIG. 25 is a view showing an example of a split setting TBL corresponding to image rotation according to the third embodiment.

DESCRIPTION OF EMBODIMENTS

[Explanation Common to Embodiments]

An image processing apparatus and image detection method as preferred embodiments of the present invention will be explained below with reference to the accompanying drawings. In each embodiment to be explained below, an information processing apparatus (image processing apparatus) that determines whether an input image contains an object will be taken as an example. The object herein mentioned is an image region having a specific feature as a detection target. Assume that the object is a human face in order to embody the explanation. The object is also called a feature region. Note that another object may also be used. Image data (to be also simply referred to as an image) as a processing target is raster image data in which pixels are arranged in a matrix. Therefore, the image quality does not degrade even when a rotating process whose unit angle is 90° is performed. However, if a rotating process whose unit angle is not 90° is performed, interpolation or the like is performed, and the image quality may deteriorate.

To simplify the explanation of each embodiment, assume that the size of a face contained in an input image is detectable by a detector. Note that it is of course possible to detect faces having many sizes by resizing one or both of the image and detector.

<Example of Face Region>

Figure 1:
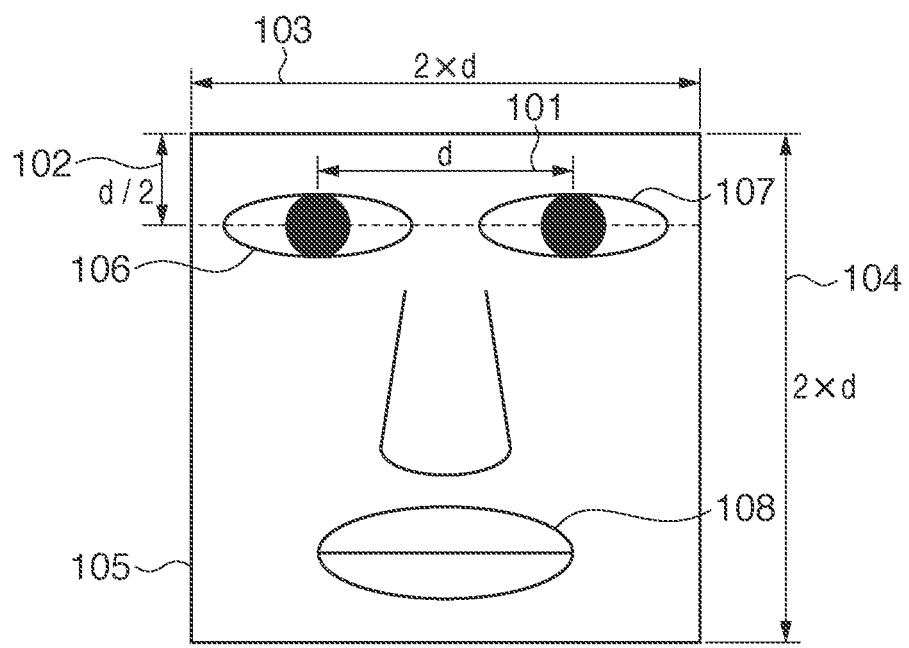
FIG. 1 is a view for explaining the definition of a face to be detected.

The face size to be detected is defined as shown in FIG. 1. An eye spacing 101 indicates the distance between the eyes, and let d be the distance between the centers of the pupils (the centers of the eyes). An eye height 102 indicates the distance from the upper side of the face region to the center of the pupil, and a distance (d/2) half that between the eyes is set. A face width 103 indicates the width of the face region, and a distance (2×d) twice that between the eyes is set. The face width 103 is uniform over the entire face region. The upper side of the face region is set in a position higher by the eye height than the eyes, so as to be parallel to a line segment connecting the pupils of the eyes. A face height 104 indicates the height of the face region, and a distance (2×d) equal to the face width is set. The face height 104 is the length of the right and left sides of the face region, and set to make a right angle with respect to the face width, that is, the upper side of the face region. The lower side of the face region is spaced apart by the face height from the upper side, and set parallel to the upper side. The upper and lower sides of the face region will sometimes be called the face width, and the right and left sides will sometimes be called the face height. As a face size 105, the size of a region surrounded by the face width and face height is set. The following embodiments will be explained by defining that the face size 105 shown in FIG. 1 is a face size to be detected (a detection target face size). Note that FIG. 1 shows a full face as an example, but the detection target face size can similarly be defined even when the face is not a full face. That is, organs such as the eyes and nose in an image are specified in a manner to be described later, and a square determined by the above-described method based on the length and direction of a line segment connecting, for example, the centers of the eyes among the specified organs is defined as a face region. Note that even a face other than a full face can be detected by searching for the contour of, for example, an eye or a nose near the eye. Note also that even for an object other than the face region, a region containing the object can be defined in an image in the same manner as that for the face region by predetermining detection target features (for example, the eyes in the face region), and determining the range of the object based on the detected features.

<Arrangement of Information Processing Apparatus>

Figure 2:
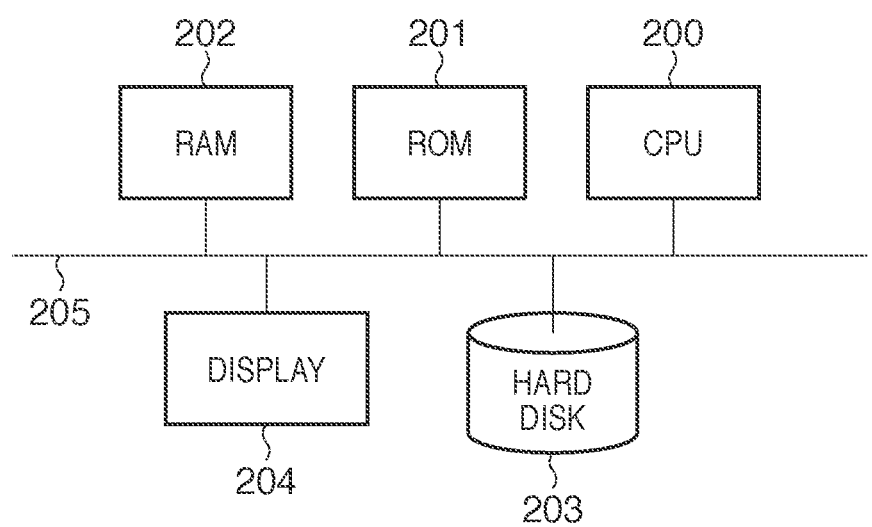
FIG. 2 is a block diagram for explaining an example of the hardware configuration of an information processing apparatus according to the first embodiment.

FIG. 2 is a block diagram for explaining an example of the hardware configuration of an information processing apparatus according to the first embodiment. This information processing apparatus, that is, a computer can also be called an image processing apparatus because the apparatus performs image processing in this embodiment. Referring to FIG. 2, a CPU (Central Processing Unit) 200 executes an information processing method, that is, an image processing method to be explained in this embodiment, in accordance with programs temporarily loaded to a RAM 202. A ROM 201 stores the programs to be executed by the CPU 200. The RAM 202 provides a memory for temporarily storing various kinds of information when the CPU 200 executes the programs. A hard disk 203 is a storage medium for storing image files, and detection parameters for pattern identification to be used in face detection. A display 204 is a device that presents the processing results of this embodiment to the user. A control bus/data bus 205 connects the above-described units and CPU 200.

<Procedure of Face Detection Process>

Figure 3:
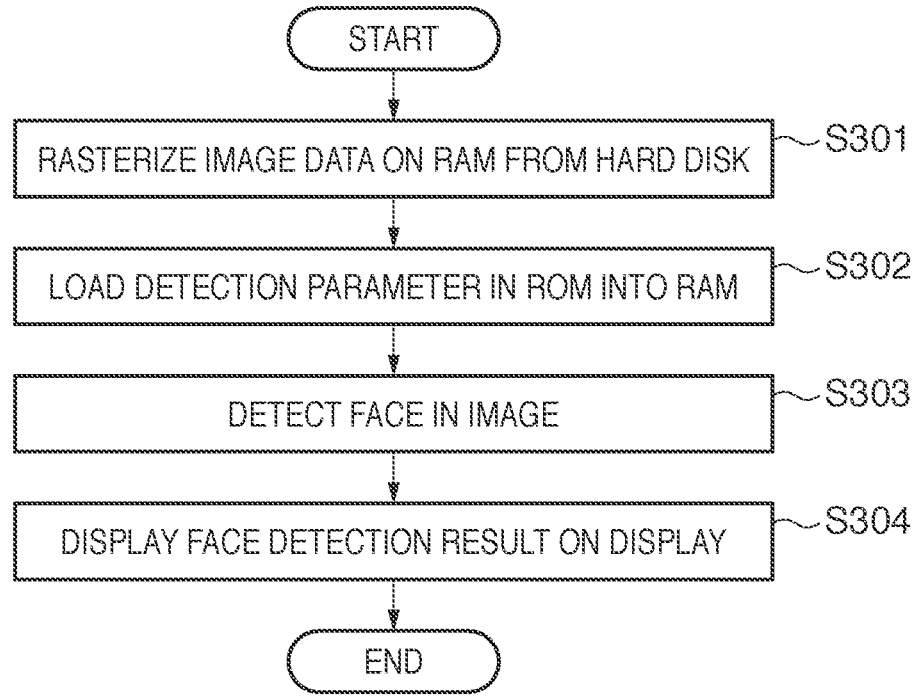
FIG. 3 is a flowchart for explaining the procedure of a face detection process according to the first embodiment.

The procedure of the overall face detection process executed by the information processing apparatus including the above configuration will be explained below with reference to a flowchart shown in FIG. 3. First, in step S301, the CPU 200 rasterizes, on the RAM 202, image data stored in the hard disk 203. The image data is held as a two-dimensional array on the RAM 202. Then, in step S302, the CPU 200 loads detection parameters such as analytical patterns to be used by a face detection algorithm from the hard disk 203 or ROM 201 into the RAM 202. In step S303, the CPU 200 determines whether there is a face in an image represented by the image data loaded in step S301, by using the detection parameters loaded in step S302. This face detection process in step S303 is the feature of the present invention, and will be explained in detail later. In step S304, the CPU 200 displays the face detection result obtained in step S303 on the display 204. Details of step S303 will be explained later with reference to FIG. 5.

FIRST EMBODIMENT

In the first embodiment, an image processing apparatus which, when detecting a face based on the position of an organ, changes a detection search range (also called a detection range) in accordance with the rotation of an image, and detects faces in all directions by combining the rotations of the image and a detector, will be explained. In this embodiment, the rotational angle of an image is an angle that interpolates the rotational angle of the detector. More specifically, the detector is rotated through 90° at a time, and face region detection is performed on an image obtained by rotating the original image so as to interpolate 90° as the rotational angle of the detector.

Note that the detector is equivalent to a face detecting unit (to be described later). In this embodiment, however, face detection is based on the detection of an organ, that is, a part forming a feature region. Therefore, an organ search unit (to be described later) can also be regarded as the detector. Rotating the detector is to change the relationship between a target image and the rotational phase of the detector by changing the detection direction of the detector. The detector is rotated because the feature region of a detection target such as a face has directivity. When the detector scans pixels by using a filter or the like, the scan direction need only be changed. For example, when there is no rotation, that is, when the direction is the basic direction, a filtering process is performed in the raster scan order by using the upper left corner of a region to be processed as the start point. In this case, rotating the detector through 90° at a unit angle is equivalent to changing the scan order so as to scan the region to be processed in the order in which an image is scanned when rotating the detector through 90° as a unit angle. For example, when the detector performs raster scan from the upper left corner as the start point such that the main scan direction is rightward and the sub scan direction is downward, the detector can be rotated clockwise through 90° by changing the scan order of raster scan such that the upper right corner is the start point, the main scan direction is downward, and the sub scan direction is leftward. Accordingly, the rotation of the detection will also be called the rotation of the detection direction.

In the following explanation, face detection will be explained by taking, as an example, a face detection algorithm using a Gabor filter and graph matching. This algorithm is a method of detecting organs based on the output results from the Gabor filter for extracting the frequency characteristics and angle characteristics, and determining whether a region of interest is a face region based on the positional relationship between the organs.

Figure 8:
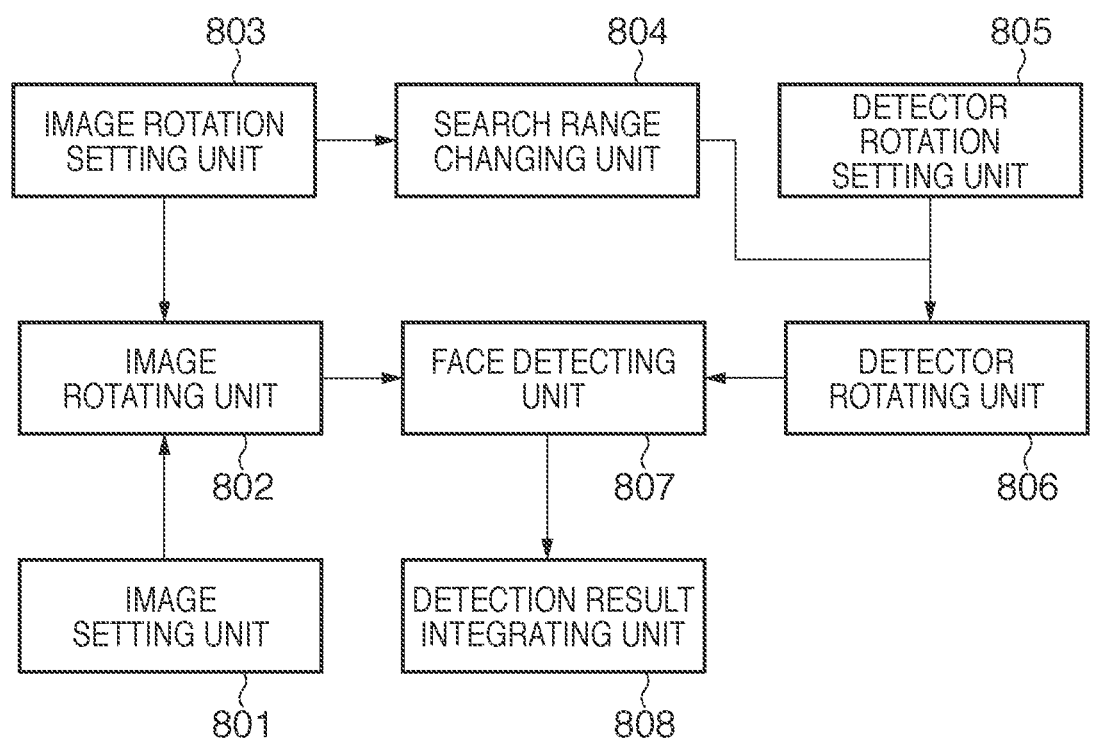
FIG. 8 is a block diagram for explaining an example of the arrangement of an image processing apparatus according to the first embodiment.

The image processing apparatus of the first embodiment will be explained below. FIG. 8 is a block diagram showing an example of the arrangement of the image processing apparatus according to the first embodiment of the present invention. FIG. 8 shows an arrangement for performing processing equivalent to steps S301 to S303 in FIG. 3. When implementing this image processing apparatus by software, each block shown in FIG. 8 is implemented by a software module as a part. The procedure is shown in, for example, FIG. 9.

Referring to FIG. 8, an image setting unit 801 sets, in a RAM area, an image for face search stored in the hard disk. The image setting unit 801 rasterizes an image file on the RAM area from the hard disk. An image rotation setting unit 803 sets the rotational angle of an image. As described previously, the rotational angle of an image is initially 0°, and 45° for the second time. An image rotating unit 802 rotates the rasterized image through the set angle. The image is rotated by a general rotating method. When the rotational angle is a multiple of 90°, the image can be rotated by replacing pixels. Accordingly, no image deterioration occurs due to a rounding error. When the rotational angle is not a multiple of 90°, however, interpolation generates a rounding error, so image deterioration occurs.

When rotating the image, positions in unrotated coordinates to which rotated coordinates correspond are calculated. After that, unrotated pixel values of the calculated coordinates are set as rotated pixel values. This coordinate conversion is performed by $$x'=[(x-cx)\times\cos(\beta)-(y-cy)\times\sin(\beta)+cx]$$

$$y'=[(x-cx)\times\sin(\beta)-(y-cy)\times\cos(\beta)+cy]$$

where x and y are unconverted image coordinates, x' and y' are converted image coordinates, cx and cy are the central coordinates of an image, and β is the rotational angle. [n] means that only an integral part of n is output. Since the equations contain trigonometric functions, decimal parts exist. A rounding error occurs when truncating the decimal parts in order to calculate coordinate positions.

A search range changing unit 804 changes the search range of an organ in accordance with the rotational angle of an image. If image deterioration occurs due to the rotation, the search range is set narrower than a predetermined range. If no image deterioration occurs, the search range remains unchanged from the predetermined range. This is so because the detection performance degrades if the detection process is performed on a deteriorated image. In this embodiment, organ search is performed on an image (original image) obtained by rotating the original image through 0°, and an image obtained by rotating the original image through 45°. When comparing the two images, the accuracy of the result of search performed on the 45°-rotated image in which image deterioration occurs due to interpolation or the like may be lower than that of the result of search performed on the original image. Therefore, the search range in the 45°-rotated image is made narrower than that in the 0°-rotated image (original image). Since the rotation of the detector has a unit angle of 90° and hence does not decrease the search accuracy, the search range is not changed due to the rotation. Note that in order not to form any search blank by narrowing the search range, the search range is changed to overlap an adjacent detection range.

A detector rotation setting unit 805 sets the rotational angle of the detector. This rotation is performed through only a unit angle of 90° in order to eliminate a rounding error caused by the rotating process. That is, the rotational angles of the detector are 0°, 90°, 180°, and 270°. Based on the set detector rotational angle, a detector rotating unit 806 performs the rotating process with respect to the organ feature and search range.

Figure 4:
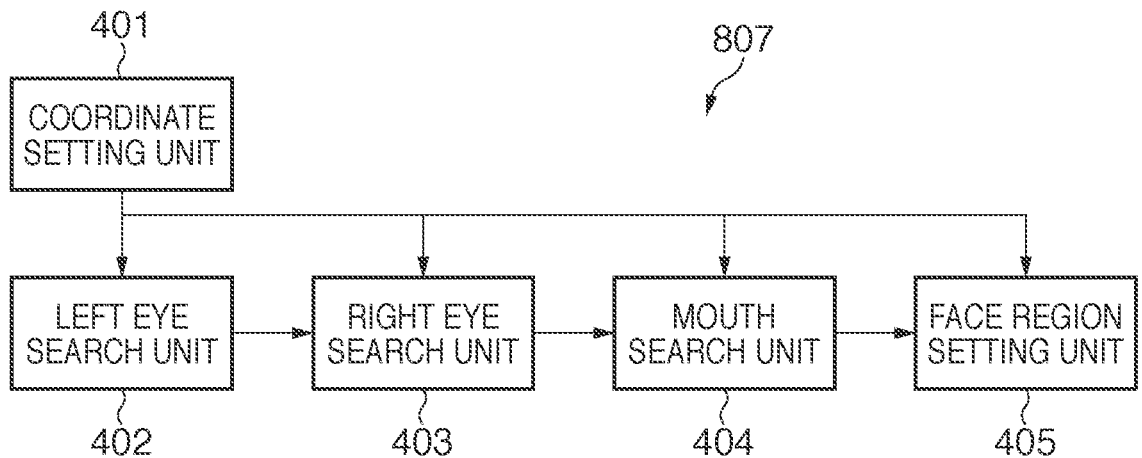
FIG. 4 is a block diagram for explaining an example of a face detection arrangement according to the first embodiment.

A face detecting unit 807 performs an organ detection process in the search region of the rotated image by using the rotated detector, and detects a face candidate region by using the detection result of each organ. FIG. 4 shows details of this process. A detection result integrating unit 808 integrates the detection results, and obtains the final detection result, that is, the face region. The foregoing is the explanation of an example of the image processing apparatus of the first embodiment.

<Operation Procedure>

The operation procedure of the image processing apparatus described above will be explained below. FIG. 9 is a flowchart showing the processing of the image processing apparatus of the first embodiment. First, the image setting unit 801 inputs an image as a face detection target, and rasterizes the image in the RAM area, thereby setting a target image (S901). Then, the image rotation setting unit 803 sets the rotational angle of the image (S902). The rotational angle is initially 0°, and 45° for the second time. Subsequently, the image rotating unit 802 rotates the image through the set angle (S903). The search range changing unit 804 changes the organ search range in accordance with the rotational angle of the image (S904). θ is set when the rotational angle is 0°, and γ is set when the rotational angle is 45°. More generally speaking, a search range narrower than that for an image rotated through an integral multiple of 90° from the original image is set for an image rotated through an angle that is not an integral multiple of 90° from the original image.

Figure 5:
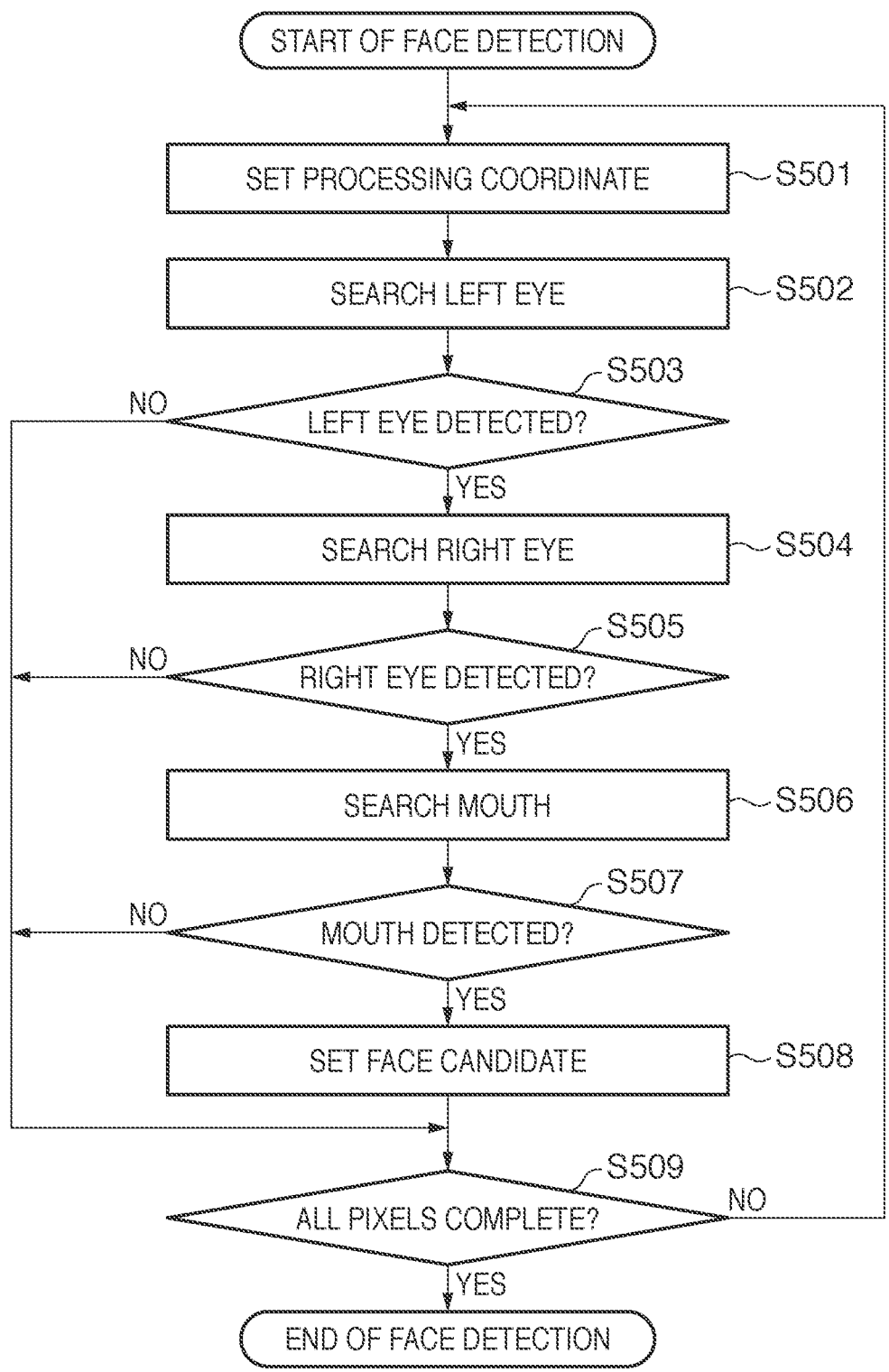
FIG. 5 is a flowchart for explaining the procedure of the face detection process according to the first embodiment.

The detector rotation setting unit 805 sets the rotational angle of the detector (S905). In this step, 0°, 90°, 180°, and 270° are sequentially set whenever step S905 is executed. The detector rotating unit 806 rotates the organ feature parameter and search range (S906). The face detecting unit 807 performs the detection process, that is, the process of searching for each organ, on the rotated image by using the rotated detector (S907). FIG. 5 shows details of step S907.

After the search process for one target range is complete, whether detector rotation necessary for all-direction detection is complete is determined (S908). If 270°-rotation and organ search are not complete, the process returns to step S905, and the detection process is performed by rotating the detector again. If the rotation and search are complete, the process advances to the next step. Then, whether image rotation necessary for all-direction detection is complete is determined (S909). If 45°-rotation is complete, it is determined that the necessary image rotation is complete. If 45°-rotation is not complete, the process returns to step S902, and the detection process is performed by rotating the image again. If the rotation is complete, the process advances to the next step. Finally, the detection result integrating unit 808 integrates the detection results, and outputs the final detection result (S910).

In the first embodiment described above, it is possible to shorten the search time and detection time by changing the organ search range in accordance with image rotation, thereby narrowing the search range. In addition, the decrease in detection performance caused by image deterioration can be suppressed by narrowing the search range when rotating an image.

<Face Detecting Unit>

The face detecting unit 807 is a device that forms a part of the image processing apparatus of this embodiment and implements face detection. When the apparatus of this embodiment is implemented by, for example, a computer, the face detecting unit as a constituent element is also a software module executed by the computer. However, the face detecting unit 807 can also be formed by hardware. As described previously, face detection is implemented by the face detection algorithm using the Gabor filter and graph matching.

FIG. 4 is a block diagram showing an example of the arrangement of the face detecting unit 807. In this embodiment, a method of performing organ detection pertaining to the eyes and mouth and performing face detection based on the positional relationship between them will be explained. This method is of course an example, and it is also possible to perform detection by using another organ or a portion as the feature of a face such as the hair or contour. A coordinate setting unit 401 sets a coordinate position as the basis of a face detection process in an image. To simplify the explanation, assume that the set coordinate position is the brow. When the search of each organ is complete (including interruption), the reference position is moved to a new position so as to scan the whole image. A left eye search unit 402 searches for the left eye within a search range designated from the brow as the reference position. The search range is preset as a parameter. The search process will be explained in detail below. The left eye search unit 402 is implemented by a general-purpose device called an organ search unit given left-eye parameters, such as the position and range of search and the feature of a search target, as input parameters. In this embodiment, the organ search unit is implemented by a software module given the position and range of search and the feature of a search target as input parameters. The constituent elements of this module are of course implemented by sub modules. If search is successful, information indicating that an image region in the search range has the feature of a search target organ is stored.

The face detecting unit 807 shown in FIG. 4 also detects other organs by using organ search units. Input parameters are of course changed in accordance with the position and range of search and the feature of a search target of each of a right eye search unit 403 and mouth search unit 404. The right eye search unit 403 searches for the right eye. The mouth search unit 404 searches for the mouth.

If all the organs are detected in the designated search region based on the organ search results, a face region setting unit 405 sets a face candidate region in which the coordinate point designated by the coordinate setting unit 401 is the position of the brow. The face region is set as explained with reference to FIG. 1. Each search unit is preset based on a face model from the brow. Therefore, the positional relationship between the organs detected by search automatically satisfies the face conditions. Note that in FIG. 4, all the search target organs, that is, the right and left eyes and the mouth are searched for. However, if an undetectable organ exists midway along the search, the search in the corresponding region is immediately interrupted.

<Organ Search Unit>

Figure 6:
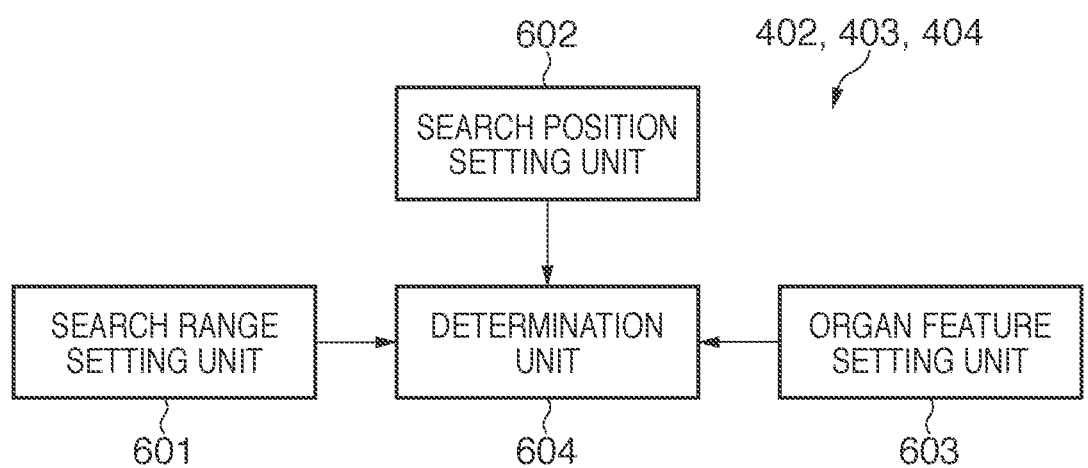
FIG. 6 is a block diagram for explaining an example of an organ search arrangement for face detection according to the first embodiment.

FIG. 6 is a block diagram showing an example of the arrangement of the organ search unit. A search range setting unit 601 sets a search range from a set position. Since the search range changes from one organ to another, the search range setting unit 601 holds the search parameters of individual organs. A search position setting unit 602 sets a search start position. The search start position changes from one organ to another. For example, the left eye is on the right side, as one faces it, of the brow as a reference position, so the right side is the search range. For example, a reference line is extended to the right from the reference point, and a range which has the reference point as a pivot and is vertically extended from the reference line at $\pm\theta°$ or $\pm\gamma°$, and in which the distance from the reference point falls within a predetermined distance range, is set as the search range. This search range is obtained by excluding a fan shape from a coaxial fan shape having a larger radius. However, it is of course also possible to restrict the search range by, for example, the distances in the vertical direction from the central line. The search ranges of the right eye and mouth are similarly determined based on the reference position. The directions to the reference point are of course different. The angle of the above-described fan shape can also be determined by the distance from the reference point to the search range, and the vertical length of the search range. Therefore, it is also possible to determine the position and size of the search range from the reference point, instead of determining the angles $\theta$ and $\gamma$ described above, so that the determined position and size correspond to the angles $\theta$ and $\gamma$. This simplifies the search because the search range can be a rectangle.

An organ feature setting unit 603 sets the feature of a search target organ. In this embodiment, the output characteristic of the Gabor filter with respect to a search target organ is set. Since the feature of the Gabor filter changes from one organ to another, the filter characteristic is held for each organ. A determination unit 604 determines whether the set search region contains an organ of interest.

Figure 7:
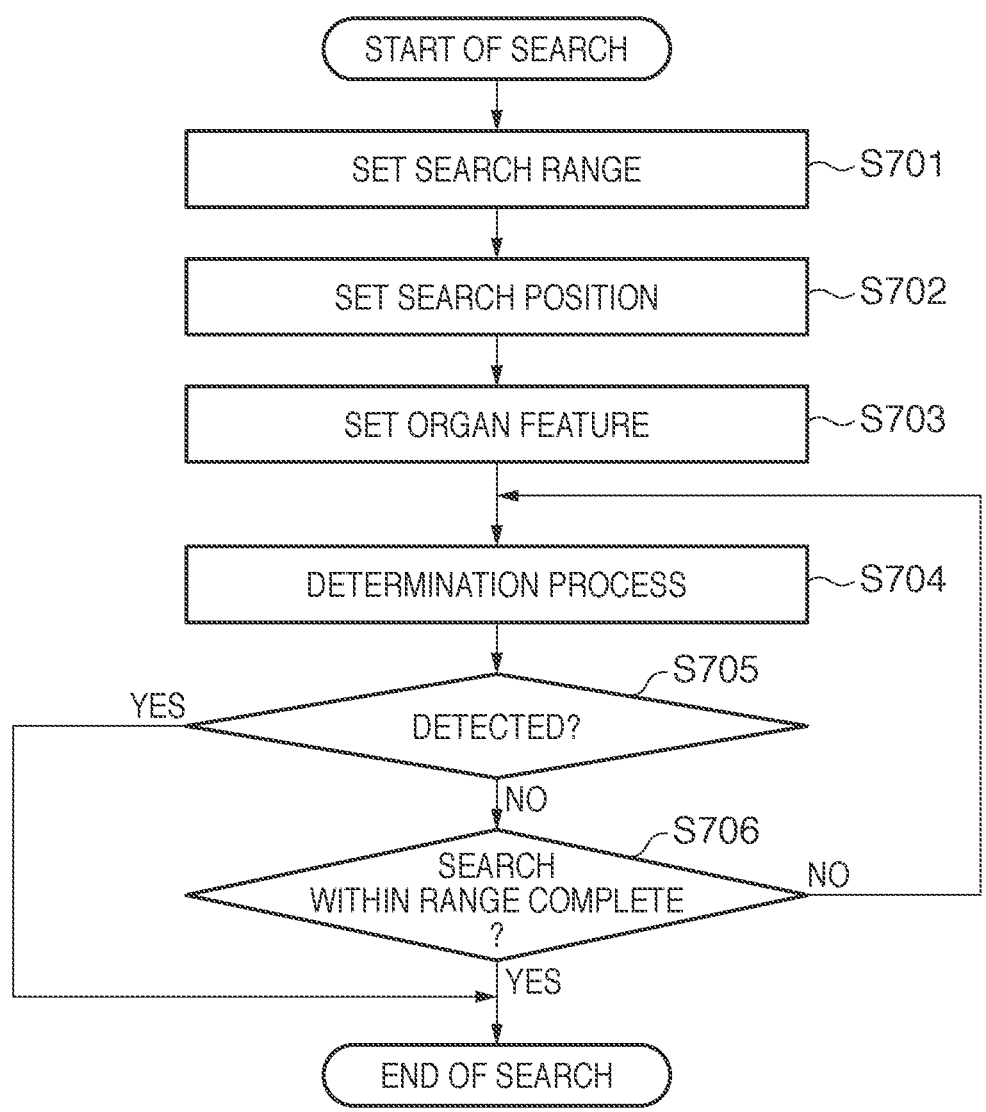
FIG. 7 is a flowchart for explaining the example of the organ search arrangement for face detection according to the first embodiment.

FIG. 7 is a flowchart showing an example of the procedure of the organ search process. That is, any of the constituent elements shown in FIG. 6 implements each step shown in FIG. 7. When the organ search device is a software module, FIG. 7 shows a procedure performed by a computer (or processor) for executing the module.

First, the search range setting unit 601 sets the search range (S701). In this embodiment, the search range has the angle $\theta$ or $\gamma$ from the reference position. Then, the search position setting unit 602 sets the organ search start position (S702). Subsequently, the organ feature setting unit 603 sets the feature of a search target organ (S703). After that, the determination unit 604 performs an organ determination process for a set pixel (S704). If the output result from the Gabor filter is equal to a preset output, the determination unit 604 determines that the pixel is the organ of interest (S705). If the organ of interest cannot be detected, this process is performed until the whole set search region is completely searched (S706).

<Example of Organ Search>

Figure 10A:
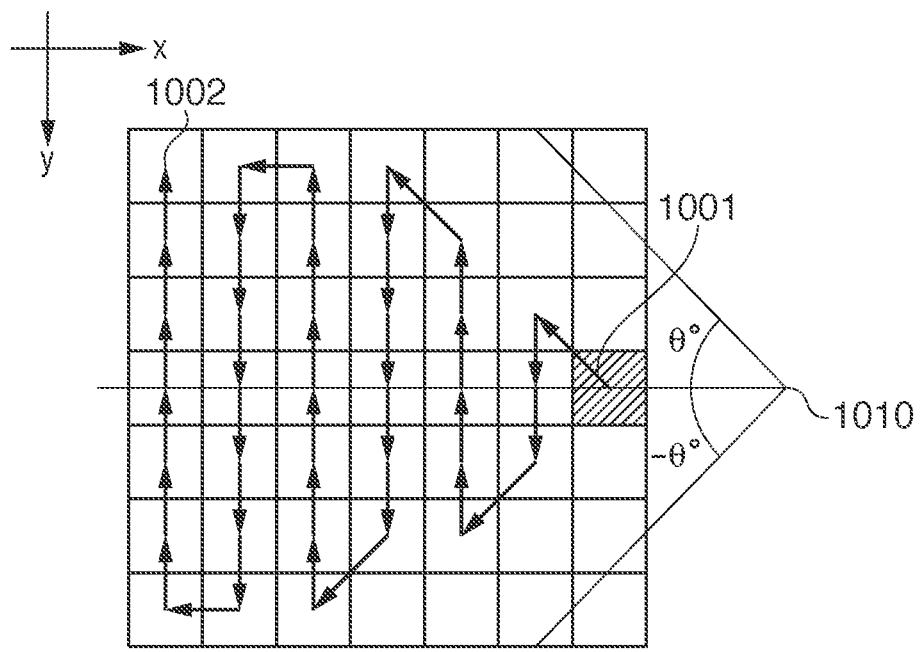
FIGS. 10A and 10B are views for explaining an example in which organ search is changed in accordance with image rotation according to the first embodiment.
Figure 10B:
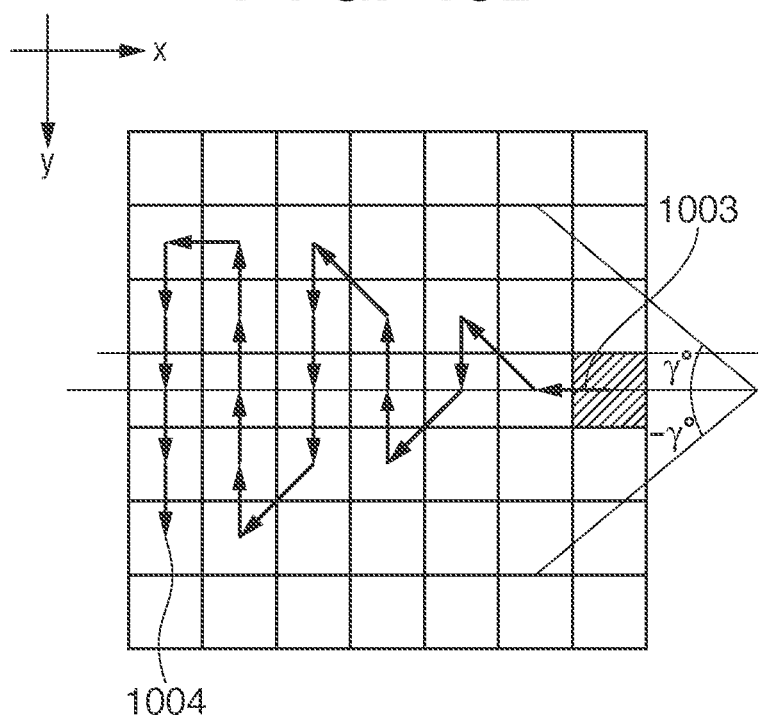
Figure 11:
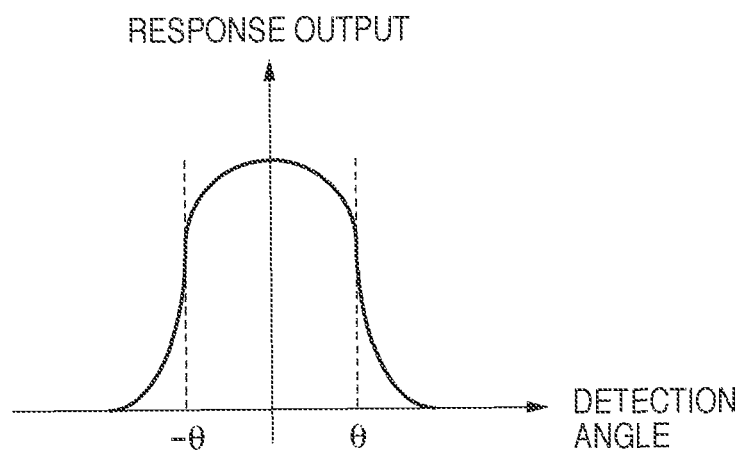
FIG. 11 is a view for explaining an example of the response characteristic of a detector.

FIGS. 10A and 10B illustrate the search for the left eye as an example of organ search. FIG. 10A shows an unchanged search range, that is, a predetermined search range. The angle $\theta$ of the search range corresponds to the search range when an image is rotated through 0° or an integral multiple of 90°. $\theta$ is an angle half that of the search range, and less than 45° in order to increase the robustness of the detector. The detector performs the process of detecting an organ of interest along arrows from a search start position 1001 on a reference line at a predetermined distance from a reference point 1010. If the organ of interest cannot be detected, the search is terminated at a search end position 1002. The vertical distance of the search range is also restricted in FIG. 10A, but this is not always necessary. The distance range from the reference point is necessary.

In this embodiment, the angle of the search range is equivalent to a searchable face inclination in an image. For example, when the right and left eyes fall within the respective search ranges with the set brow as the center, the face can be detected even if it inclines. This similarly applies to the mouth. Letting $\theta$ be an angle half that of the search range, therefore, it is possible to detect a face inclining through $\pm\theta$ with the brow as the center.

FIG. 10B shows a changed search range. That is, FIG. 10B shows a search range to be applied to an image obtained by rotating the original image through 45°. The angle $\gamma$ of the search range is calculated by $$\gamma(°)=(90-2\theta)/2+\alpha \quad (1)$$

where $\alpha$ represents the overlap amount of the detection ranges, and an appropriate value is set. Note that from the spirit and scope of the present invention, $\theta$ and $\gamma$ must be determined so that $\theta>\gamma$. Accordingly, $\theta>(45-\alpha)/2$ is the condition of equation (1). Note also that one purpose of the overlap angle $\alpha$ is to accurately search for even an organ positioned in the boundary between search ranges. Therefore, $\alpha$ is so selected, but it is also possible to experimentally determine $\alpha$ such that, for example, the best search result is obtained. According to equation (1), $\gamma$ is 15°+$\alpha$ when $\theta$ is set at 30°. By thus determining $\theta$ and $\gamma$ and rotating the detector through 90° at a time, a face is detected in an image obtained by rotating the original image through 0° or 45°. This makes it possible to detect a face having any inclination from an image.

<Face Detection Procedure>

FIG. 5 is a flowchart showing an example of the procedure of the face detection process explained so far. The procedure shown in FIG. 5 shows face detection executed by using software by a computer (or CPU) as the main component of the execution. Also, steps S502, S504, and S506 are implemented by using the organ search process shown in FIG. 7 as a subroutine while changing parameters in accordance with organs.

First, the coordinate setting unit 401 sets the reference coordinate position where the detection process is performed (S501). The set coordinate position is regarded as the brow. Then, the left eye search unit 402 searches for the left eye within the designated range from the brow coordinates (S502). If the left eye is detected, the process continues. If the left eye is not detected, the process skips to step S509 (S503). Subsequently, the right eye search unit 403 searches for the right eye within the designated range from the brow coordinates (S504). If the right eye is detected, the process continues. If the right eye is not detected, the process skips to step S509 (S505). The mouth search unit 404 searches for the mouth within the designated range from the brow coordinates (S506). If the mouth is detected, the process continues. If the mouth is not detected, the process skips to step S509 (S507). The face candidate setting unit 405 stores the brow coordinates as a face region in the memory (S508). Then, whether the series of detection processes are executed for all pixels is determined. If the detection processes are completely executed, the face detection process is terminated; if not, the process returns to step S501 and continues by moving the reference position to the next coordinates (S509). If the face region is detected, for example, the moving distance can be the length of the side of the face region. The reference position is moved so as to scan the whole image by using the detected face region as a unit. On the other hand, if no face region is detected, the moving distance is, for example, the length of the side of a face region determined based on the set search range of each organ. It is of course also possible to move the reference position by a distance predetermined by another criterion. The foregoing is the procedure of the face detection process.

As described above, the organ search filter can be changed for each target organ, and can also be changed in accordance with the rotational angle of an image. In addition, the search range is changed in accordance with the rotational angle of the image. This makes it possible to detect faces in all directions of an image, and rapidly detect a face region with high accuracy.

Note that in this embodiment, the rotational angle of the original image is 45° that is the half of 90°. However, if the detection range of the detector is narrow, the rotational angle can be a smaller angle, for example, can be 30° or 22.5° that are respectively ⅓ or ¼ of 90°, instead of the half of 90°. When the rotational angle of an image is 30°, the total number of search target images is three, that is, the original image itself, a 30°-rotated image, and a 60°-rotated image. When the rotational angle of an image is 22.5°, the total number of search target images is four, that is, the original image itself, a 22.5°-rotated image, a 45°-rotated image, and a 67.5°-rotated image. However, if the detection range can be nonuniform, not all of these images need be used. In this embodiment, the detection ranges overlap each other at the angle α. By increasing the angle α, therefore, all directions can be covered even if the detection range is nonuniform.

SECOND EMBODIMENT

In the second embodiment, an apparatus which, when performing face detection by using AdaBoosting, controls a weak classifier to be used in accordance with the rotation of an image, and detects faces in all directions by combining the rotations of the image and a detector, will be explained. The second embodiment differs from the first embodiment in that the detection range is not narrowed by changing the search range, but narrowed by controlling a weak classifier to be used. However, when a strong classifier implemented by combining weak classifiers is regarded as a face region detector, the search range is changed in this embodiment as well. In this embodiment, however, the search range is changed by selecting a weak classifier to be used.

In the following second embodiment, an example in which the detection range is narrowed by controlling a weak classifier to be used in accordance with the rotation of an image. An information processing apparatus for implementing an image processing apparatus of the second embodiment is the same as that of the first embodiment, so a repetitive explanation will be omitted. A detector, that is, a strong classifier constructed by weak classifiers has directivity in this embodiment as well.

Figure 12:
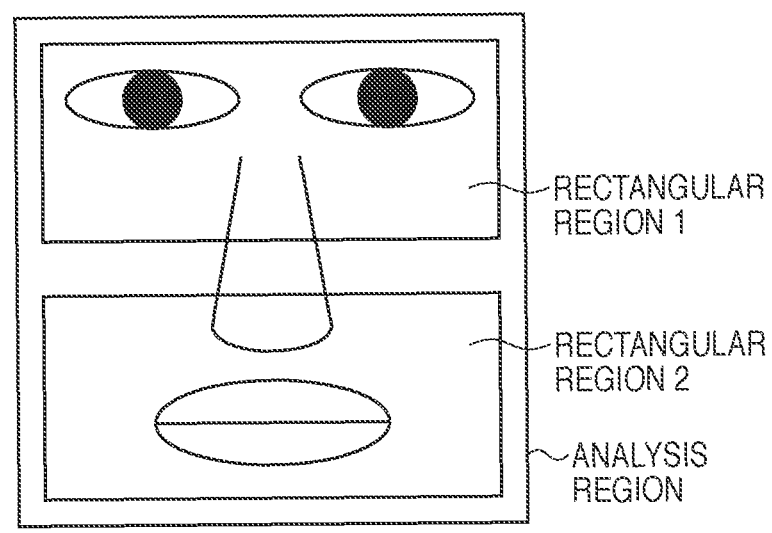
FIG. 12 is a view for explaining an example in which a rectangular region to be analyzed is set in a weak classifier.
Figure 13:
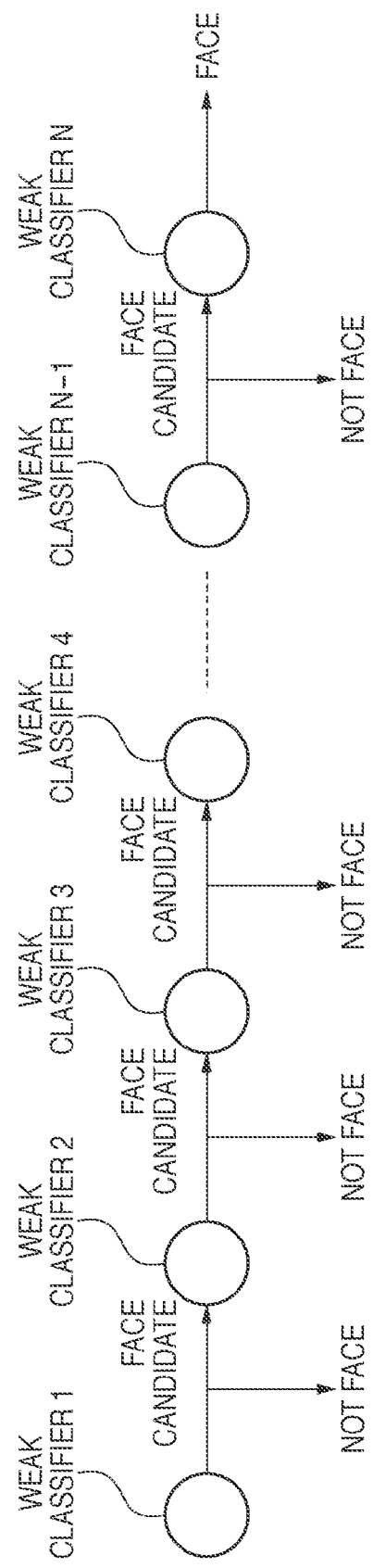
FIG. 13 is a view for explaining an example of AdaBoosting for implementing a strong classifier by connecting weak classifiers in series according to the second embodiment.

AdaBoost is a method of implementing a strong classifier by connecting a number of weak classifiers in series. A Haar-type rectangular feature amount is set in each weak classifier. For the sake of explanation, as shown in FIG. 12, one weak classifier is set to analyze two rectangular regions. The weak classifier analyzes the rectangular feature amount of each rectangular region, and adds an evaluation value if the relationship between the feature amounts is the same as a pre-learned result. A rectangular feature amount to be analyzed changes from one weak classifier to another. For example, one weak classifier classifies the edge amount in the lateral direction as a feature amount, another classifier classifies the variance of luminance, and still another classifier classifies the number of pixels in a specific color range. In this embodiment as described above, a feature amount suited to organ detection is selected. However, this is merely an example, and another feature amount can also be used. As shown in FIG. 13, one strong classifier (that is, a detector) is implemented by connecting weak classifiers in series. Each weak classifier aborts processing when an added evaluation value obtained by adding up the evaluation values of rectangular regions becomes equal to or smaller than a set threshold value, thereby increasing the processing speed. If all the weak classifiers finally determine that the rectangular region is a face candidate, a region specified by the rectangular region is output as a face region.

Figure 14:
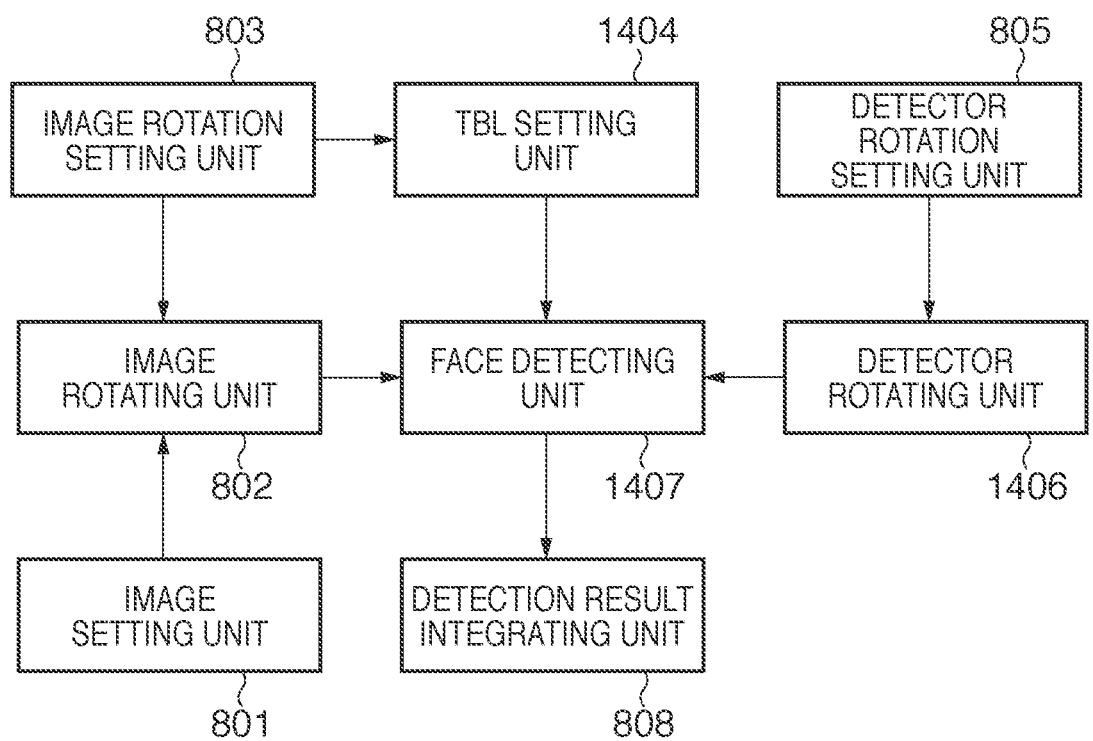
FIG. 14 is a block diagram for explaining an example of the arrangement of an image processing apparatus according to the second embodiment.

FIG. 14 is a block diagram showing an example of the arrangement of the image processing apparatus according to the second embodiment of the present invention. The same reference numerals as in FIG. 8 denote the same processing contents as explained in the first embodiment, so a repetitive explanation will be omitted, and only differences from the first embodiment will be explained. The rotation of an image and the rotation of the detector are the same as in the first embodiment. A TBL (also called a weak classifier application table) concerning the settings of weak classifiers to be used is set in a TBL setting unit 1404. In the TBL, "1" is set for a weak classifier to be used, and "0" is set for a weak classifier not to be used.

Figure 18:
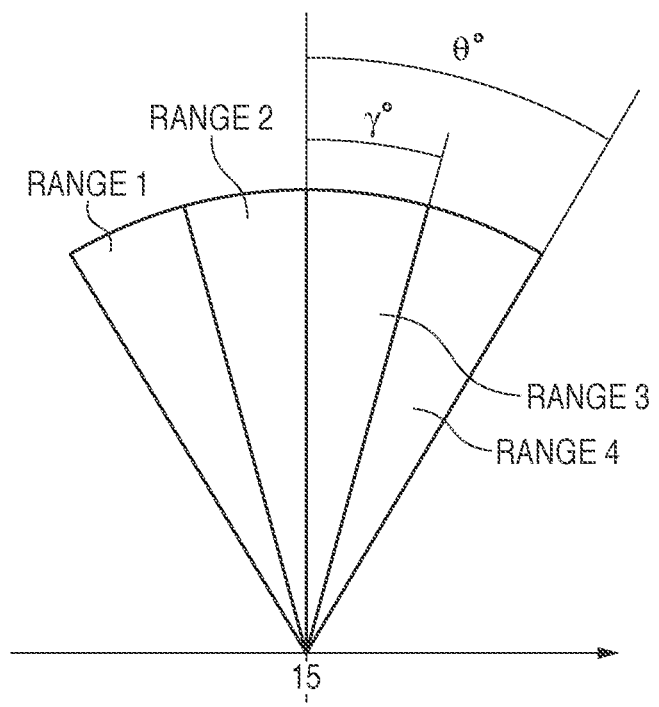
FIG. 18 is a view showing an example in which a face detection range is divided.

A method of forming the TBL will be explained below. As shown in FIG. 19A, the angle characteristic of each weak classifier is checked. The angle characteristic is obtained by dividing a detectable range, and defining each range, as shown in FIG. 18. θ° is the detection degree of the detector disclosed in the first embodiment, and γ° is calculated based on equation (1). As a method of checking the angle characteristic, a detection process is performed by inputting an image containing an inclined face corresponding to each range shown in FIG. 18, and the output characteristic of a weak classifier is measured. A range within which the output characteristic is strong is regarded as the angle characteristic of the weak classifier, and a correspondence table as shown in FIG. 19A is formed. The TBL (weak classifier application table) is formed based on the formed correspondence table. To narrow the detection range when rotating an image, "0"

indicating a weak classifier not to be used is set for weak classifiers of "range 1" and "range 4", and "1" indicating a weak classifier to be used is set for weak classifiers of "range 2" and "range 3" (FIG. 19C). When the detection range is not to be narrowed, "1" indicating a weak classifier to be used is set for all the weak classifiers of "range 1" to "range 4" (FIG. 19B). Thus, two types of TBLs shown in FIGS. 19B and 19C are formed, and a TBL to be set is changed in accordance with the rotation of an image, thereby controlling the weak classifiers and changing the detection range.

Referring to FIG. 14 again, a detector rotating unit 1406 rotates the analysis target rectangular region of each weak classifier in accordance with the set angle. A face detecting unit 1407 performs a detection process on a rotated image by using the rotated weak classifier and the set TBL. Details of the face detecting unit will be explained below.

Figure 16:
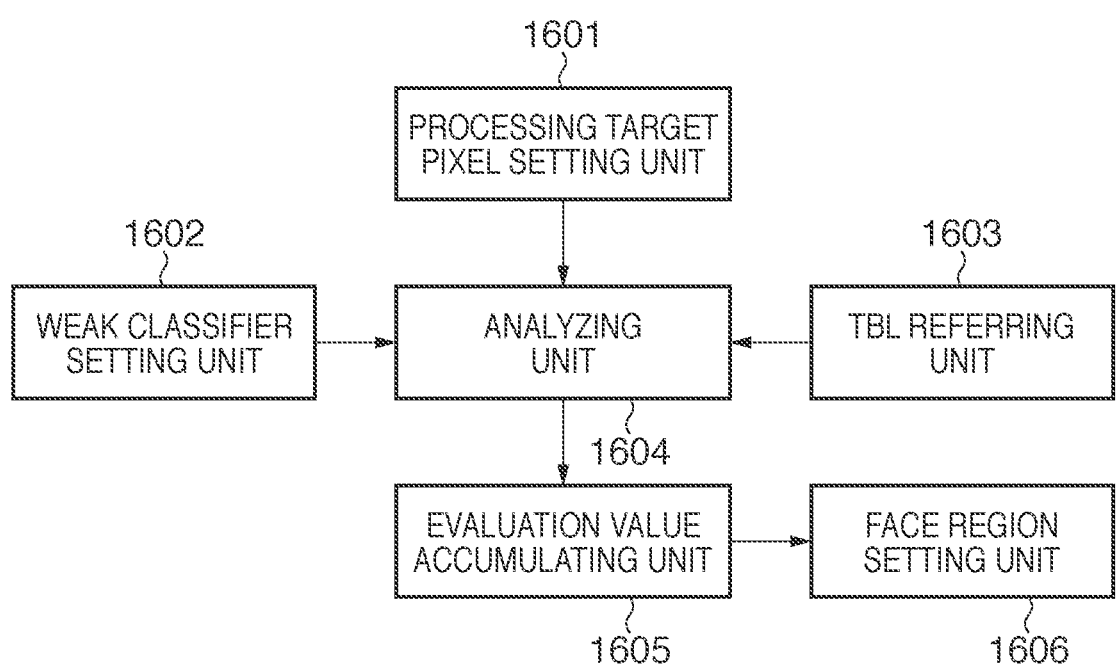
FIG. 16 is a block diagram for explaining an example of a face detection arrangement according to the second embodiment.

FIG. 16 shows an example of the arrangement of the face detecting unit 1407. A processing target pixel setting unit 1601 sets image data to be analyzed by weak classifiers. A weak classifier setting unit 1602 sets weak classifiers to be used in processing. A TBL referring unit 1603 determines whether a weak classifier is to be used in processing by referring to the TBL, and outputs the result. This TBL is a TBL changed in accordance with image rotation. An analyzing unit 1604 analyzes the image by using the set weak classifiers and TBL, and performs threshold determination. An evaluation value accumulating unit 1605 accumulates the evaluation values based on the determination result from the analyzing unit 1604. A face region setting unit 1606 determines whether the processing target pixel is a face region, based on the accumulated evaluation value, after the processing of all the weak classifiers.

Figure 17:
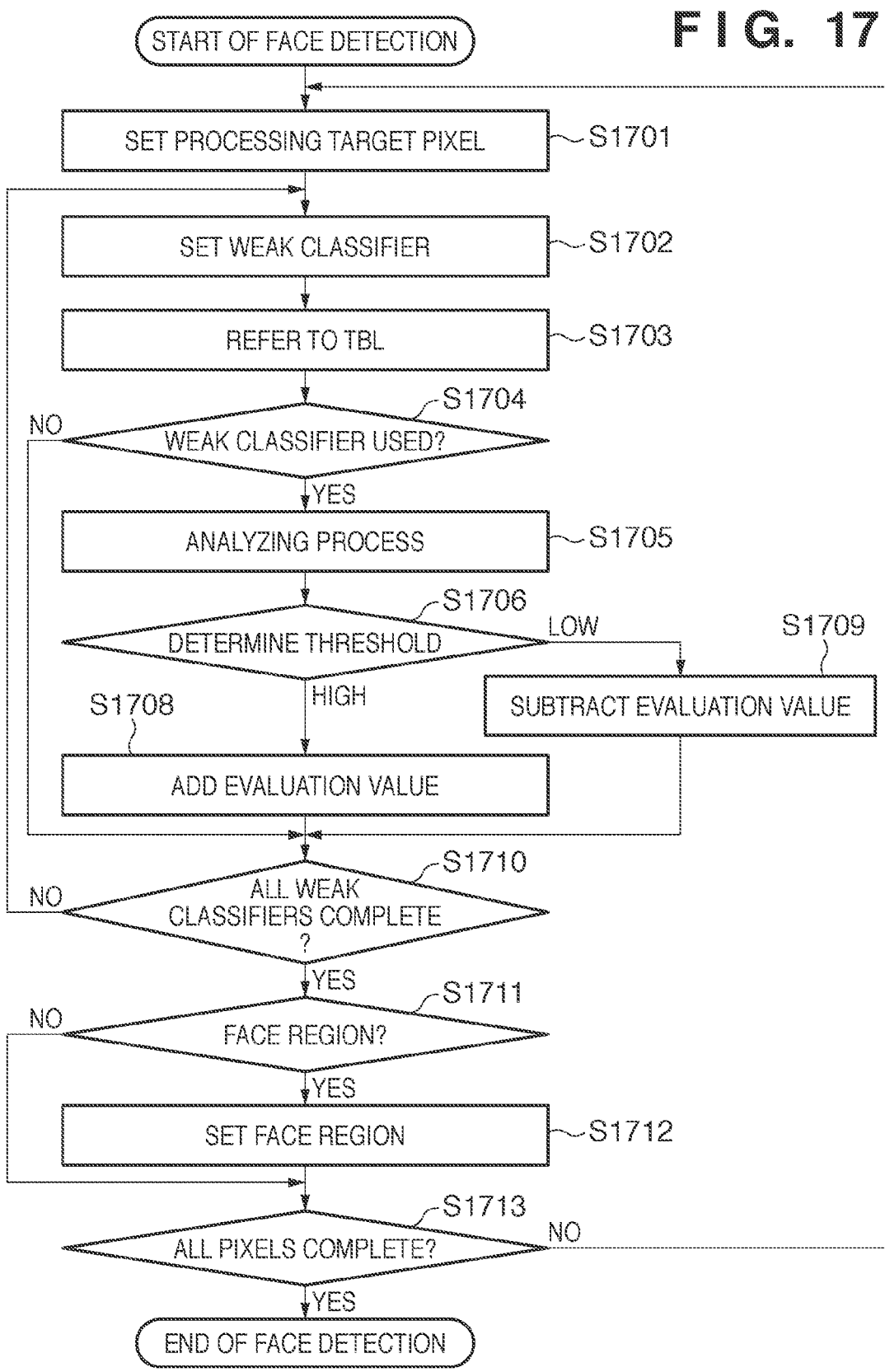
FIG. 17 is a flowchart for explaining the procedure of a face detection process according to the second embodiment.

The procedure of the above-described face detecting operation will be explained below. FIG. 17 is a flowchart of the face detection process. First, the processing target pixel setting unit 1601 sets image data to be processed (S1701). Then, the weak classifier setting unit 1602 sets weak classifiers to be used in determination (S1702). The TBL referring unit 1603 refers to the TBL for setting the weak classifiers to be used (S1703). If the TBL indicates a weak classifier to be used, the process continues. If the TBL indicates a weak classifier not to be used, the process skips to step S1710. Subsequently, the analyzing unit 1604 performs an analyzing process in an image region by using the set weak classifiers (S1705). Threshold determination is performed based on the analytical result (S1706). The evaluation value accumulating unit 1605 adds the evaluation value to the accumulated value if the evaluation value is larger than the threshold value (S1708), and subtracts the evaluation value from the accumulated value if the evaluation value is smaller than the threshold value (S1709). The evaluation values to be added or subtracted may be different every weak classifiers. Whether all the weak classifiers have executed the processing is determined (S1710). If all the weak classifiers have executed the processing, the process advances to the next step; if not, the process returns to step S1702 to repeat the series of processes by using the next weak classifier. Then, whether the processing target region is a face region is determined based on the accumulated evaluation value (S1711). If the region is found to be a face, the face region setting unit 1606 sets the region as a face candidate (S1712). After that, whether the detection process has been performed on all pixels is determined (S1713). If the process has been performed on all pixels, the process is terminated; if not, the process returns to step S1701 to repeat the series of processes on the next processing target pixel. The foregoing is the detailed procedure of the face detection process.

The image processing apparatus of the second embodiment has been explained above.

Figure 15:
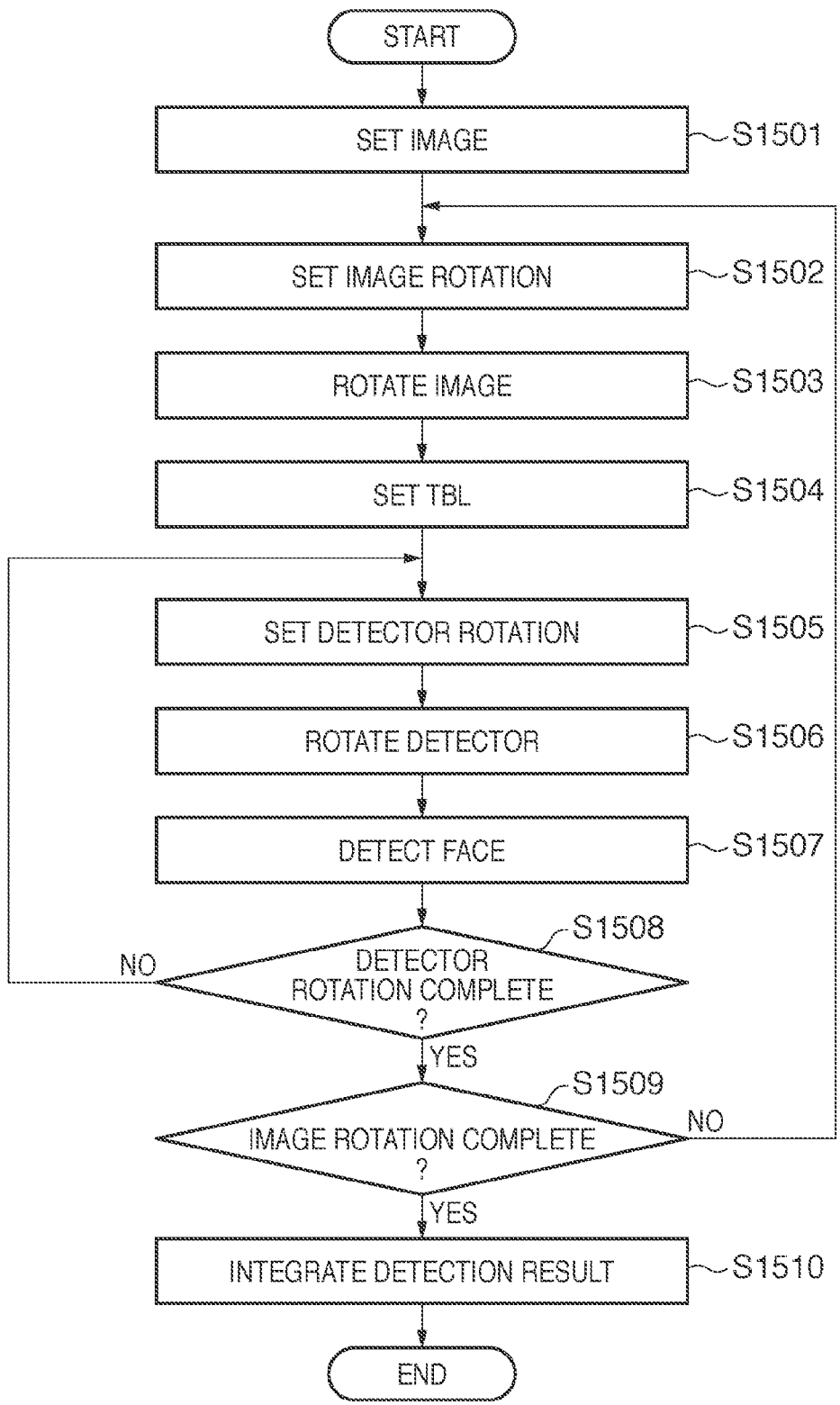
FIG. 15 is a flowchart for explaining the example of the arrangement of the image processing apparatus according to the second embodiment.

Next, the operation procedure of the above-described image processing apparatus will be explained. FIG. 15 is a flowchart of the processing of the image processing apparatus. First, an image setting unit 801 inputs a face detection target image, and rasterizes the image in the RAM area (S1501). Then, an image rotation setting unit 803 sets the rotational angle of the image (S1502). An image rotating unit 802 rotates the image through the angle set by the image rotation setting unit 803 (S1503). The TBL setting unit 1404 sets a TBL pertaining to weak classifiers to be used, in accordance with the set angle (S1504). A detector rotation setting unit 805 sets the rotational angle of the detector (S1505). The detector rotating unit 1406 rotates the analysis target rectangular region of each weak classifier (S1506).

Subsequently, the face detecting unit 1407 performs a detection process on the rotated image by using the rotated detector (S1507). Whether detector rotation required to detect faces in all directions is complete is determined (S1508). If the rotation is not complete, the process returns to step S1505, and the detection process is performed by rotating the detector again. If the rotation is complete, the process advances to the next step. After that, whether image rotation required to detect faces in all directions is complete is determined (S1509). If the rotation is not complete, the process returns to step S1502, and the detection process is performed by rotating the image again. If the rotation is complete, the process advances to the next step. Finally, a detection result integrating unit 808 integrates the detection results, and outputs the final detection result (S1510).

In the second embodiment as described above, weak classifiers to be used in accordance with image rotation are changed in accordance with the sensitive angle range, so the search range can be narrowed. Since the number of weak classifiers to be used reduces, the detection time can be shortened. In addition, the search range is narrowed when rotating an image because the image deteriorates when rotated. Accordingly, the deterioration of the detection performance can be suppressed.

In this embodiment, the method of changing weak classifiers to be used in accordance with image rotation has been explained. However, it is of course also possible to control another item. For example, it is possible to change the threshold value of each weak classifier in accordance with image rotation, so that a weak classifier falling outside the range does not determine that the region of interest is a face region. When the threshold value rises and it is determined that the region of interest is not a face region, the accumulated evaluation value decreases. Therefore, the region is regarded as a target of an aborting process to be executed after the processing of each weak classifier, and the processing is interrupted. Since the timing of abortion becomes earlier, the processing speed increases. It is also possible to suppress detection errors and the deterioration of the detection performance because the threshold value rises.

THIRD EMBODIMENT

In the third embodiment, an apparatus which, when performing face detection by using discrete AdaBoosting by which weak classifiers are arranged into a discrete structure in accordance with the states of faces, controls a split to be used in accordance with the rotation of an image, and detects faces in all directions by combining the rotations of the image and a detector, will be explained. The third embodiment differs from the second embodiment in that the detection range is narrowed by controlling splits, instead of controlling weak classifiers to be used. When a strong classifier implemented by combining weak classifiers is regarded as a face region detector, the search range is changed in this embodiment as well. In this embodiment, however, the search range is changed by selecting weak classifiers to be used. This point is common to the second embodiment. This embodiment differs from the second embodiment in that a feature region, that is, a face is detected in a more sensitive direction in accordance with the intensity of a detected feature signal.

In the following third embodiment, an example in which the detection range is narrowed by controlling splits to be used in accordance with the rotation of an image will be explained. An information processing apparatus for implementing an image processing apparatus of the third embodiment is the same as that of the second embodiment, so a repetitive explanation will be omitted.

Discrete AdaBoosting is a detection method of making the robustness higher than that of AdaBoosting by arranging weak classifiers into a discrete structure in accordance with the states of faces. Similarities to AdaBoosting are that evaluation values are accumulated in accordance with the determination results of weak classifiers, and determination is finally performed based on the evaluation value, and that abortion determination is performed after the determination of each weak classifier. Splitting as a difference will be explained by noting only the direction of a face. However, it is of course also possible to perform splitting in accordance with another element such as the size of a face.

Figure 20:
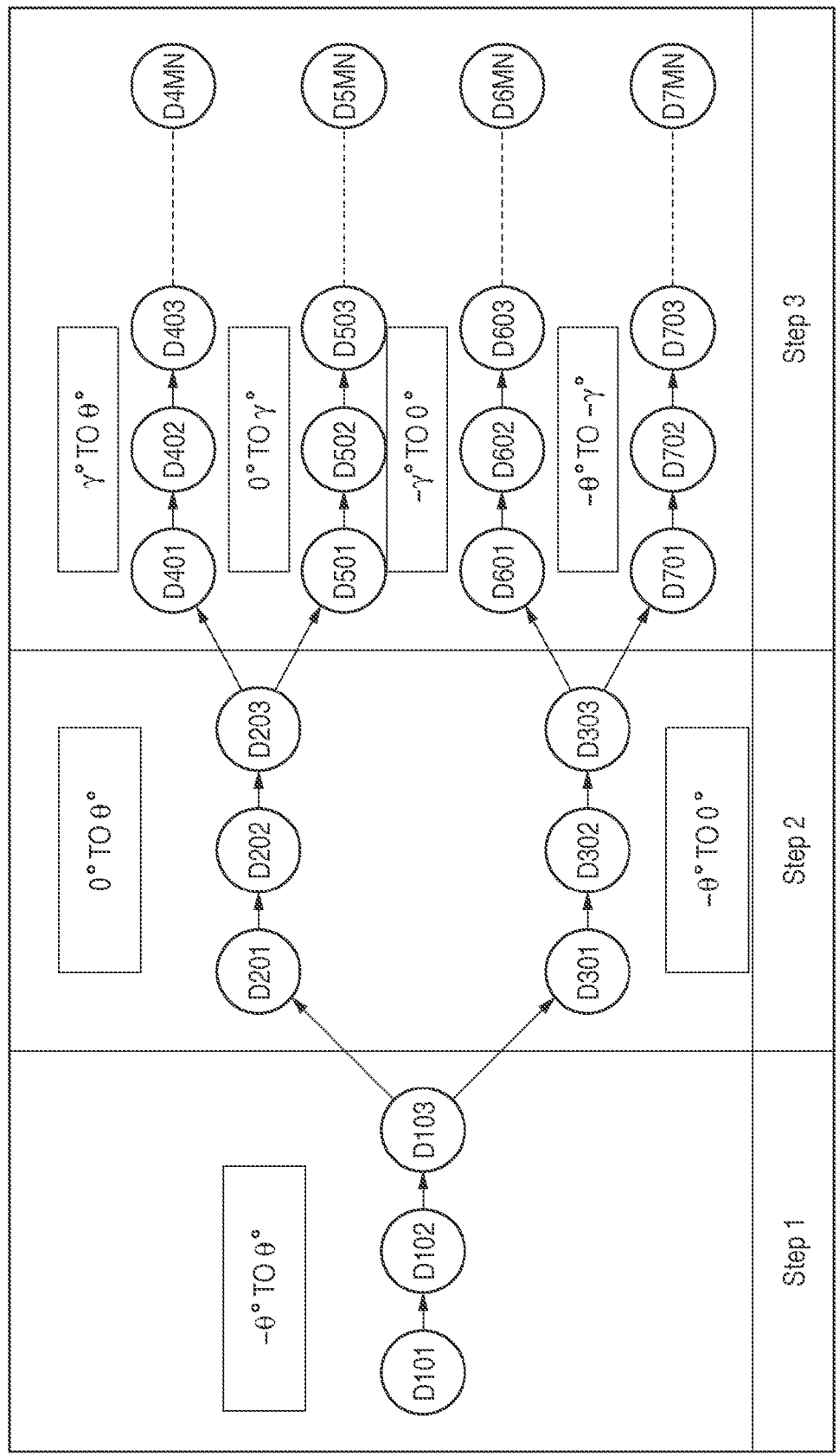
FIG. 20 is a view showing an example of split AdaBoosting.

FIG. 20 shows an example of split AdaBoosting in which weak classifiers are split in accordance with the direction of a face. Step (also called stage) is a unit indicating the zone of each splitting. The definition shown in FIG. 18 is used for the direction of a face. First, in step 1, weak classifiers having a processing target of $-\theta$ to $\theta$ that is the entire range of a detector process an image. In step 2, weak classifiers perform detection based on the accumulated evaluation value of weak classifiers D101 to D103. The accumulated evaluation value ($-\theta$ to 0) of weak classifiers D201 to D203 is compared with that of weak classifiers D301 to D303 (0 to $\theta$), and a split having a larger accumulated evaluation value is continued. The processing of a split having a lower evaluation value is aborted. If the number of splits is large, a plurality of splits can simultaneously be processed in parallel. Weak classifiers splitting from the split found to have a larger accumulated evaluation value by the comparison result continue the evaluation of the image. That is, if the accumulated evaluation value of the weak classifiers D201 to D203 is larger, the split (the range is $\gamma$ to $\theta$) of weak classifiers D401 to D4MN and the split (the range is 0 to $\gamma$) of weak classifiers D501 to D5MN continue the evaluation. On the other hand, if the accumulated evaluation value of the weak classifiers D301 to D303 is larger, the split (the range is $-\gamma$ to 0) of weak classifiers D601 to D6MN and the split (the range is $-\theta$ to $-\gamma$) of weak classifiers D701 to D7MN continue the evaluation. Note that $\gamma<\theta$. Since splitting is performed in accordance with an inclination to which a weak classifier is sensitive, a detector, that is, a strong classifier constructed by weak classifiers has directivity in this embodiment as well.

For example, if the accumulated evaluation value of the weak classifiers D301 to D303 is larger in the splitting in step 2, the split of the weak classifier D601 and succeeding weak classifiers and the split of the weak classifier D701 and succeeding weak classifiers continue the processing in step 3. Splitting is controlled by thus comparing the results of evaluations simultaneously performed by weak classifiers in parallel, and a face is finally determined from an evaluation value processed by the last weak classifier.

Figure 21:
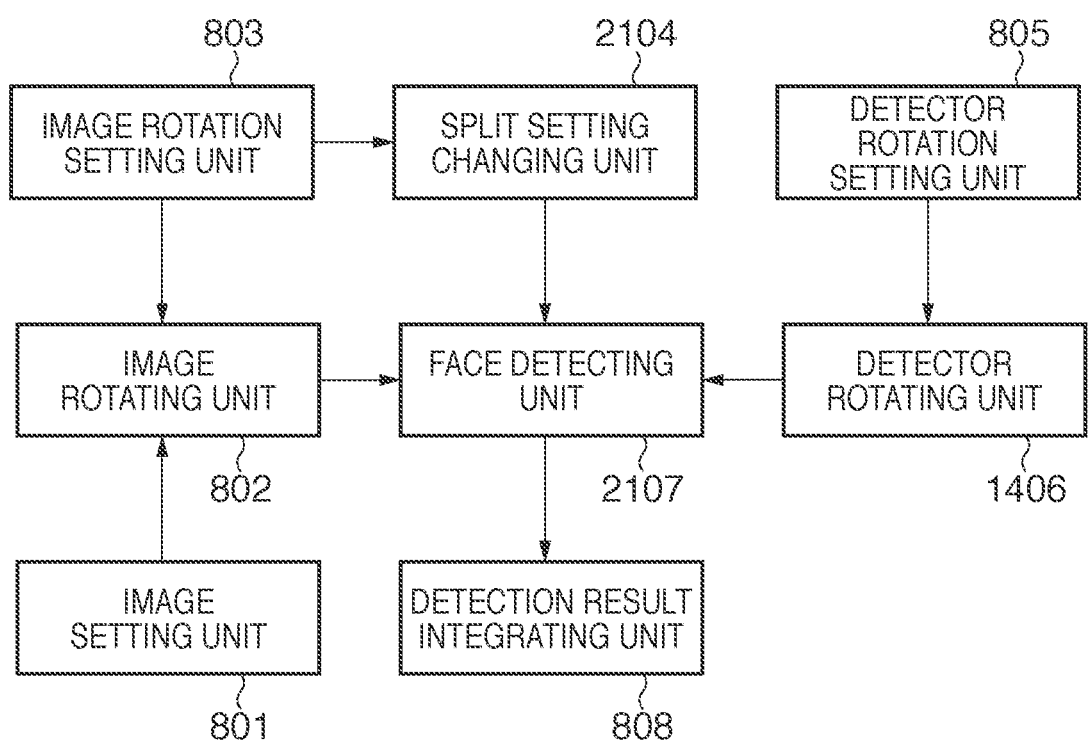
FIG. 21 is a block diagram for explaining an example of the arrangement of an image processing apparatus according to the third embodiment.

FIG. 21 is a block diagram showing an example of the arrangement of the image processing apparatus according to the third embodiment of the present invention. The same reference numerals as in FIG. 14 denote the same processing contents as explained in the second embodiment, so a repetitive explanation will be omitted, and only differences from the second embodiment will be explained. Also, the rotation of an image and the rotation of the detector are the same as in the first embodiment. A split setting changing unit 2104 sets a split to be used in accordance with an image rotation setting unit 803. A split to be used is set by referring to a TBL shown in FIG. 25. The TBL stores the number of splits in each step, and the start address (indicated by *) of weak classifiers to be used, in accordance with the image rotational angle. By referring to this TBL, a split to be used is set in accordance with the rotational angle of an image. A detection process is performed by performing a split determination process within the range of a split to be used. A face detecting unit 2107 performs a detection process on a rotated image by using a rotated weak classifier in a split to be used.

Figure 23:
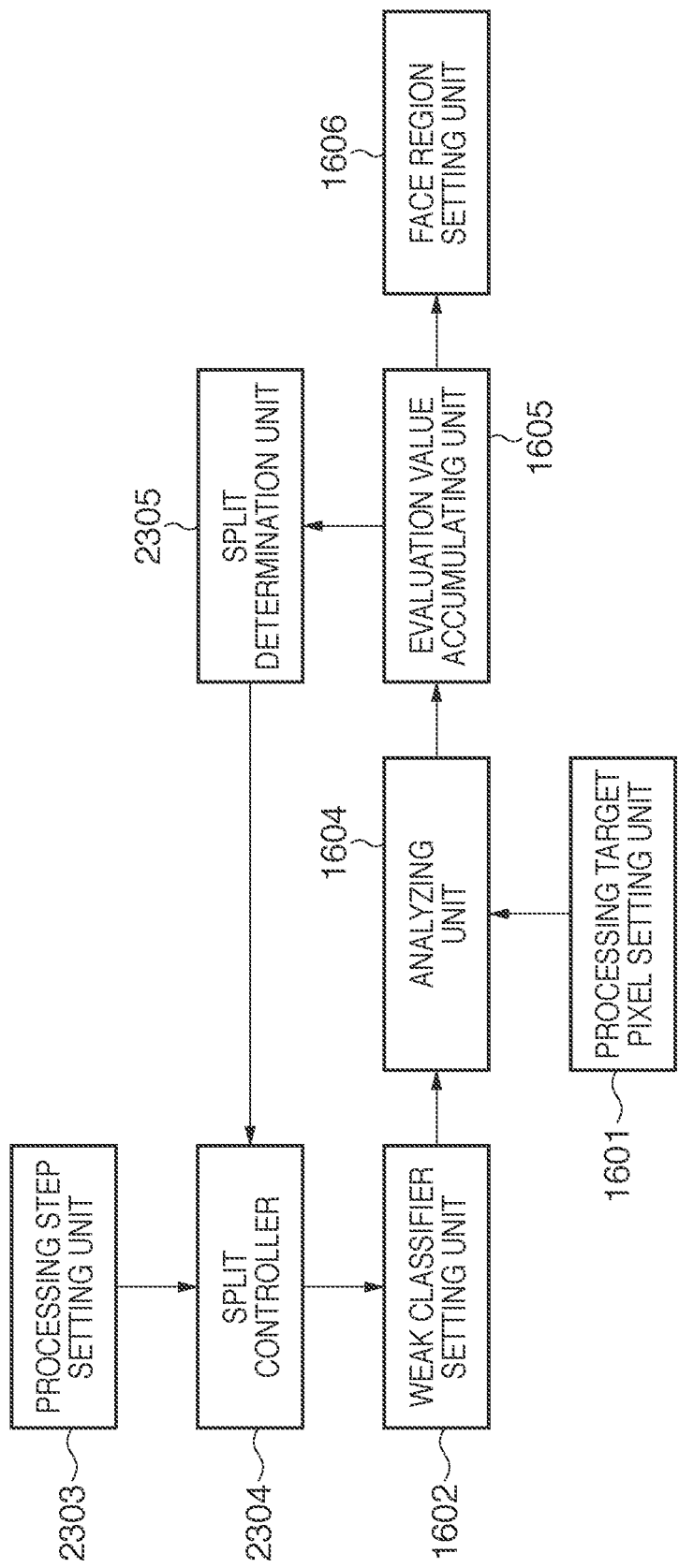
FIG. 23 is a block diagram for explaining an example of a face detection arrangement according to the third embodiment.

FIG. 23 shows an example of the arrangement of the face detecting unit 2107. The same reference numerals as in FIG. 16 denote the same contents as explained in the second embodiment, so a repetitive explanation will be omitted, and only differences from the second embodiment will be explained. A processing step setting unit 2303 sets a processing step of split AdaBoosting. A split to be used set by the TBL is set in a split controller 2304. The split setting changing unit 2104 sets a split to be used in accordance with the rotation of an image. A split determination unit 2305 compares accumulated evaluation values processed by all weak classifiers of different splits, and determines that a split having a larger evaluation value is a continuous split. The foregoing is the explanation of the arrangement of the face detecting unit.

Figure 24:
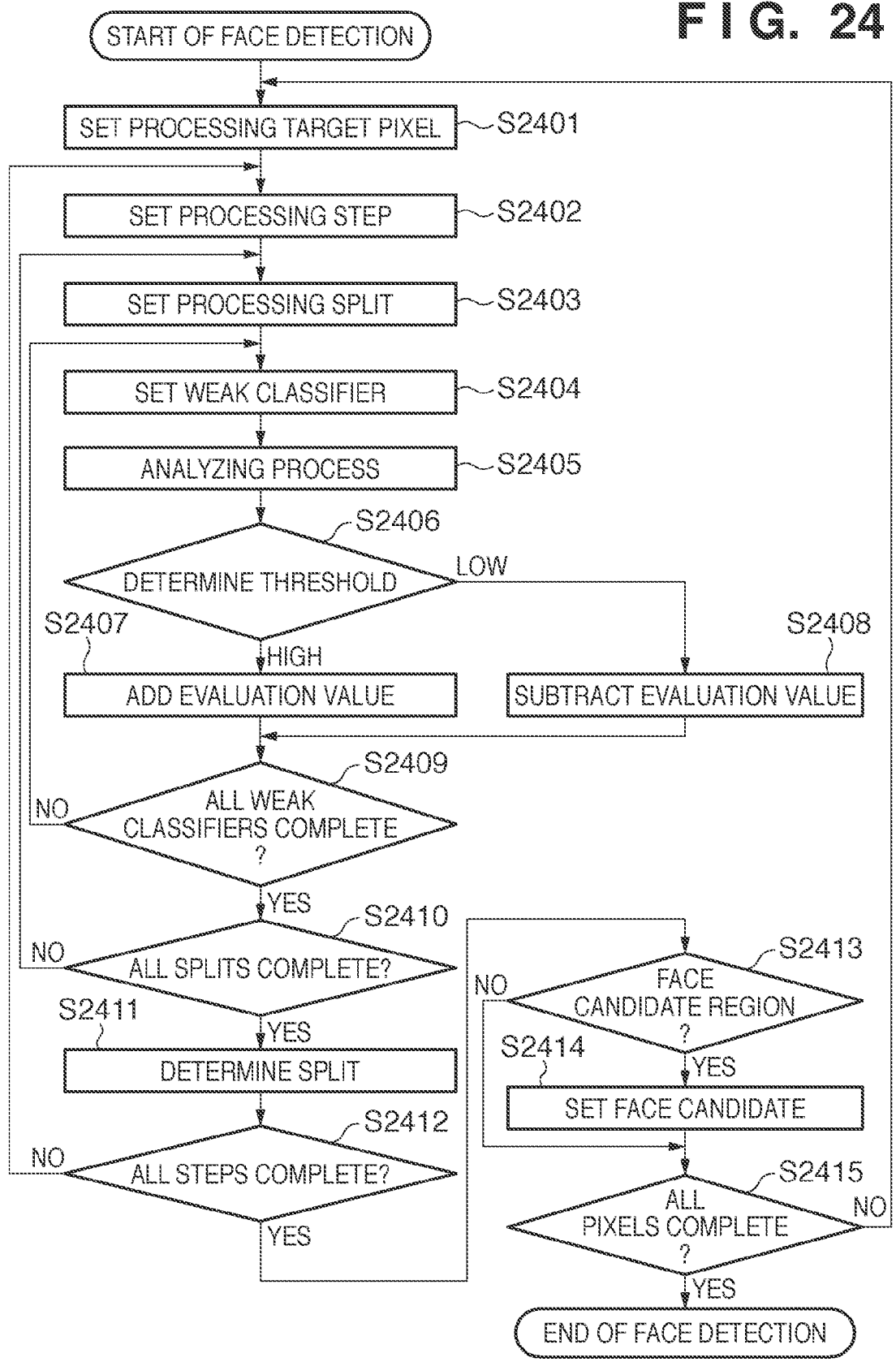
FIG. 24 is a flowchart for explaining the procedure of a face detection process according to the third embodiment.

FIG. 24 shows a detailed flowchart of the face detecting unit. First, a processing target pixel setting unit 1601 sets image data to be processed (S2401). Then, the processing step setting unit 2303 sets a processing step (S2402). The split controller 2304 sets a split to be used changed by the rotational angle of an image, based on the split table TBL (S2403). The settings of splits to be used are determined by the split table exemplarily shown in FIG. 25. In step S2403, a split, that is, a weak classifier sequence that continues the evaluation in the next step is determined based on the evaluation result in the preceding step, the step to which the process advances next, and the rotational angle of the image. Subsequently, a weak classifier setting unit 1602 sets a weak classifier that actually performs an evaluation process in the determined split to be used (S2404). That is, weak classifiers are connected in series in each stage. Therefore, weak classifiers in the first stage of the sequence sequentially perform evaluation, and the evaluation result, that is, the evaluation result in the preceding stage is used as the basis for the selection of a weak classifier by directivity, as a weak classifier in the next stage. That is, in accordance with the evaluation result in the preceding stage, directivity detectable by a weak classifier in the next stage is narrowed down step by step.

Then, an analyzing unit 1604 analyzes the image by the weak classifier determined in step S2404 (S2405). Threshold determination is performed based on the analytical result (S2406). An evaluation value accumulating unit 1605 adds the evaluation value to the accumulated evaluation value if the evaluation value is higher than the threshold value (S2407), and subtracts the evaluation value from the accumulated evaluation value if the evaluation value is lower than the threshold value (S2408). Whether this processing has been executed for all weak classifiers between steps is determined (S2409). If the processing has been executed for all weak classifiers, the process advances to the next step; if not, the process returns to step S2404, and the series of processes are repeated for the next weak classifier. In addition, whether all splits have executed the processing is determined (S2410). If all splits have executed the processing, the process advances to the next step; if not, the process returns to step S2403, and the series of processes are repeated for the next split. The split determination unit 2305 determines a split to be continued by comparing the accumulated evaluation values of the splits (S2411). Then, whether the series of processes have been executed for all steps is determined (S2412). If the series of processes have been executed for all steps, the process advances to the next step; if not, the process returns to step S2402, and the series of processes are repeated in the next step. After all the steps have been executed, whether the pixel is a face region is determined from the accumulated evaluation value (S2413). If it is determined that the pixel is a face region, a face candidate setting unit 1606 sets the processed pixel as a face region (S2414). After that, whether the detection process has been performed on all pixels is determined (S2415). If the process has been executed on all pixels, the process is terminated; if not, the series of processes are repeated on the next processing target pixel. The foregoing is the detailed procedure of the face detection process. The image processing apparatus of the third embodiment has been explained above.

Figure 22:
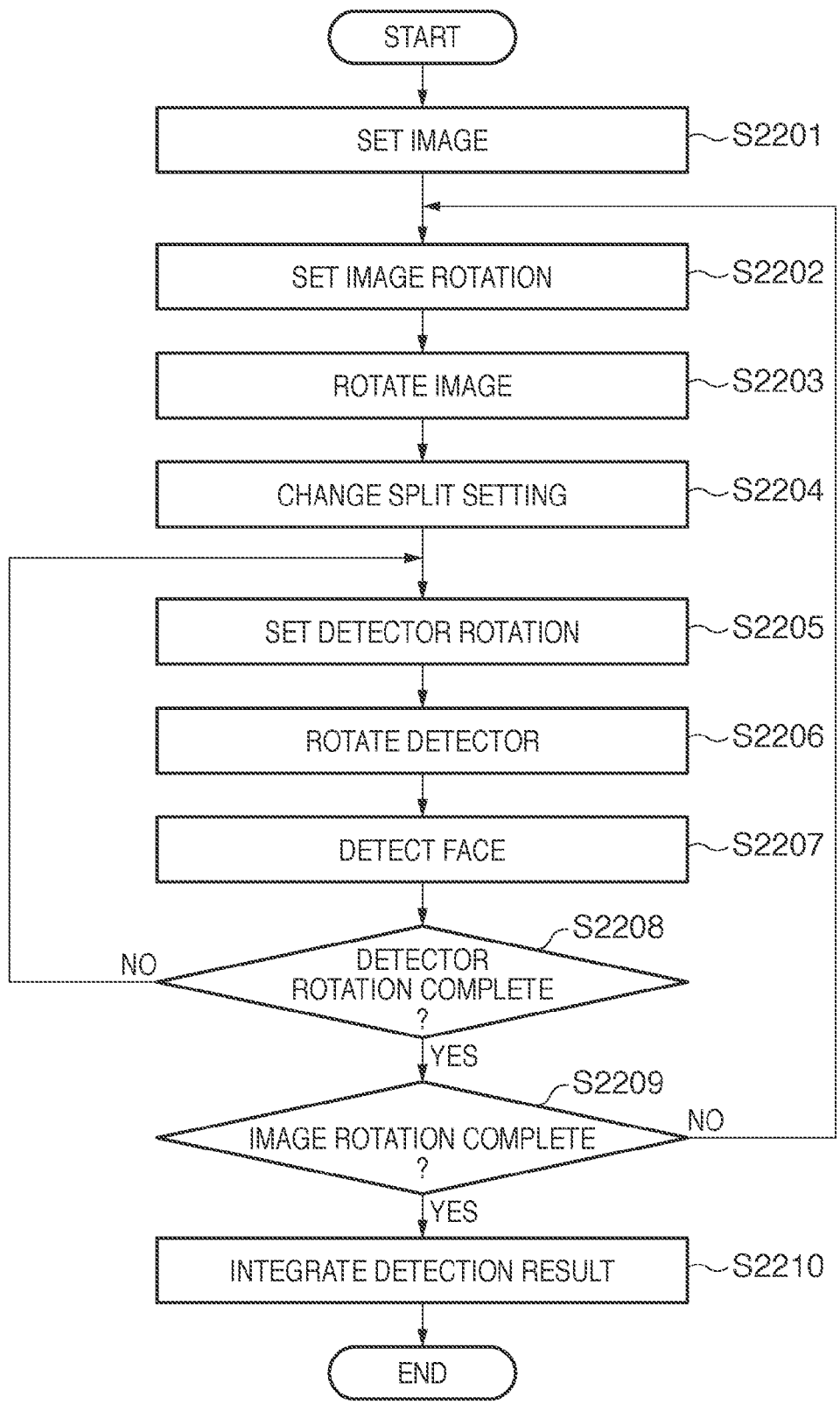
FIG. 22 is a flowchart for explaining an example of the arrangement of the image processing apparatus according to the third embodiment.

Next, the operation procedure of the above-described image processing apparatus will be explained. FIG. 22 is a flowchart of the image processing. First, an image setting unit 801 inputs a face detection target image, and rasterizes the image in the RAM area (S2201). Then, an image rotation setting unit 803 sets the rotational angle of the image (S2202). An image rotating unit 802 rotates the image in accordance with the set angle (S2203). The split setting changing unit 2104 sets a split to be used in accordance with the angle of the rotated image (S2204). More specifically, the upper stage of the table shown in FIG. 25 is set if the angle is 0°, and the lower stage is set if the angle is 45°. Subsequently, a detector rotation setting unit 805 sets the rotational angle of the detector (S2205). A detector rotating unit 1406 rotates the analysis target rectangular region of each weak classifier in accordance with the set angle (S2206). The face detecting unit 2107 performs a detection process on the image by using a detector in the split (S2207). A procedure shown in FIG. 24 shows details of step S2207. Then, whether detector rotation required to detect faces in all directions is complete is determined (S2208). If the rotation is not complete, the process returns to step S2205, and the series of detection processes are repeated by further rotating the detector. If the rotation is complete, the process advances to the next step. After that, whether image rotation required to detect faces in all directions is complete is determined (S2209). If the rotation is not complete, the process returns to step S2202, and the series of detection processes are performed by rotating the image. If the rotation is complete, the process advances to the next step. Finally, a detection result integrating unit 808 integrates the detection results, and outputs the final detection result (S2210).

Since the face detecting unit 2107 is configured as described above, the search range (search angle) is −θ to θ if the image rotational amount is an integral multiple of 90° with respect to the original image, and −γ to γ if not.

In the third embodiment as described above, the search range can be narrowed by changing a split to be used in split AdaBoosting in accordance with image rotation. Therefore, the detection time can be shortened by splits not to be used. In addition, when an image is rotated, the detection performance readily decreases because the image deteriorates. Accordingly, the decrease in detection performance can be suppressed by narrowing the search range when rotating an image.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-207155, filed Sep. 15, 2010, which is hereby incorporated by reference herein in its entirety.

The invention claimed is:

1. An image processing apparatus for detecting an object in an image, comprising:
    an input unit configured to input an image;
    an image rotating unit configured to rotate the image in a predetermined angle; and
    a detection unit configured to perform both of detection of an object inclined at angles within a first angle range in the image input by the input unit and detection of an object inclined at angles within a second angle range in the image rotated by the image rotation unit;
    wherein the second angle range is narrower than the first angle range, wherein
    the detection unit is configured to perform object detection processing by a split AdaBoosting with a first number of splits for detecting an object inclined at angles within the first angle range in the image input by the input unit, and to perform the object detection processing by the split AdaBoosting with a second number of splits for detecting an object inclined at angles within the second angle range in the image rotated by the image rotating unit, and wherein the second number of splits is smaller than the first number of splits.

2. The apparatus according to claim 1, wherein the predetermined angle rotated by said image rotating unit is 45°.

3. The image processing apparatus according to claim 1, wherein the object is an image object of a face.

4. An image processing method of detecting an object in an image that is executed by an image processing apparatus, said method comprising:
    inputting an image;
    rotating the image in a predetermined angle; and
    performing both of detection of an object inclined at angles within a first angle range in the image input in the inputting and detection of an object inclined at angles within a second angle range in the image rotated in the rotating, wherein the second angle range is narrower than the first angle range, wherein the object detection processing is performed by a split AdaBoosting with a first number of splits for detecting an object inclined at angles within the first angle range in the input image, and the object detection processing is performed by the split AdaBoosting with a second number of splits for detecting an object inclined at angles within the second angle range in the rotated image, and wherein the second number of splits is smaller than the first number of splits.

5. A non-transitory computer-readable medium that has recorded thereon a program for causing a computer to execute an image processing method, the image processing method executed by at least one processor of an image processing apparatus, the method comprising:
an input step of inputting an image;
an image rotation step of rotating the image in a predetermined rotational angle; and
a detection step of performing both of detection of an object inclined at angles within a first angle range in the image input in the input step and detection of an object inclined at angles within a second angle range in the image rotated in the image rotation step,
wherein the second angle range is narrower than the first angle range, wherein the object detection processing is performed by a split AdaBoosting with a first number of splits for detecting an object inclined at angles within the first angle range in the input image, and the object detection processing is performed by the split AdaBoosting with a second number of splits for detecting an object inclined at angles within the second angle range in the rotated image, and wherein the second number of splits is smaller than the first number of splits.

6. An image processing apparatus for detecting an object in an image, comprising:
an image rotating unit configured to rotate the image in a predetermined angle; and
a detection unit configured to perform detection of an object inclined at angles within a first angle range in the image rotated by the image rotating unit in a case where the predetermined angle is an integer multiple of 90 degrees and to perform detection of an object inclined at angles within a second angle range in the image rotated by the image rotation unit in a case where the predetermined angle is not an integer multiple of 90 degrees,
wherein the second angle range is narrower than the first angle range, wherein
the detection unit is configured to perform object detection processing by a split AdaBoosting with a first number of splits for detecting an object inclined at angles within the first angle range, and to perform the object detection processing by the split AdaBoosting with a second number of splits for detecting an object inclined at angles within the second angle range, and wherein the second number of splits is smaller than the first number of splits.

7. An image processing method of detecting an object in an image that is executed by an image processing apparatus, said method comprising:
rotating the image in a predetermined angle; and
performing detection of an object inclined at angles within a first angle range in the image rotated in the rotating in a case where the predetermined angle is an integer multiple of 90 degrees and detection of an object inclined at angles within a second angle range in the image rotated in the rotating in a case where the predetermined angle is not an integer multiple of 90 degrees,
wherein the second angle range is narrower than the first angle range, wherein
object detection processing is performed by a split AdaBoosting with a first number of splits for detecting an object inclined at angles within the first angle range, and object detection processing is performed by the split AdaBoosting with a second number of splits for detecting an object inclined at angles within the second angle range, and wherein the second number of splits is smaller than the first number of splits.

* * * * *